(12) United States Patent
Agrawal et al.

(10) Patent No.: US 7,664,774 B2
(45) Date of Patent: Feb. 16, 2010

(54) SEQUENCE BASED PHYSICAL DESIGN TUNING

(75) Inventors: Sanjay Agrawal, Sammamish, WA (US); Lik Han Chu, Bellevue, WA (US); Vivek R. Narasayya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 11/345,593

(22) Filed: Feb. 1, 2006

(65) Prior Publication Data

US 2007/0192280 A1 Aug. 16, 2007

(51) Int. Cl.
G06F 7/00 (2006.01)
G06F 12/00 (2006.01)
G06F 17/00 (2006.01)
(52) U.S. Cl. .................. 707/102; 707/2; 707/200
(58) Field of Classification Search .......... 707/2, 707/102, 200
See application file for complete search history.

(56) References Cited

U.S. PATENT DOCUMENTS

| 6,266,658 B1* | 7/2001 | Adya et al. ............... 707/2 |
| 6,598,038 B1* | 7/2003 | Guay et al. ............... 707/2 |
| 2004/0002957 A1* | 1/2004 | Chaudhuri et al. ............ 707/2 |
| 2005/0223026 A1* | 10/2005 | Chaudhuri et al. ...... 707/103 R |
| 2006/0085484 A1* | 4/2006 | Raizman et al. ............ 707/200 |

OTHER PUBLICATIONS

Ravishankar, "Some Results on Search Complexity vs Accuracy" http://web.archive.org/web/20020821085242/http://www.nist.gov/speech/publications/darpa97/html/ravisha1/ravisha1.htm.*

Joseph M. Hellerstein et al, "Adaptive Query Processing: Technology in Evolution", 2000.*

Weikum et al, "Self-tuning Database Technology and Information Services: from Wishful Thinking to Viable Engineering", 2002, Proceedings of the 28$^{th}$ VLDB Conference.*

Joseph M. Hellerstein et al, "Adaptive Query Processing: Tecnology in Evolution", Published in 2000.*

Sanjay Agrawal et al., Database Tuning Advisor for Microsoft SQL Server 2005, Proceedings of the 30th VLDB Conference, 2004, pp. 1110-1121.

Sanjay Agrawal et al., Integrating Vertical and Horizontal Partitioning into Automated Physical Database Design, ACM SIGMOD, 2004, pp. 359-370.

Nicholas Bruno and Surajit Chaudhuri, Automatic Physical Database Tuning: A Relaxation-based Approach, ACM SIGMOD, 2005.

Surajit Chaudhuri et al., SQLCM: A Continuous Monitoring Framework for Relational Database Engines, Proceedings of the 20th International Conference on Data Engineering, 2004.

(Continued)

Primary Examiner—Mohammad Ali
Assistant Examiner—Brannon W Smith
(74) Attorney, Agent, or Firm—Lee & Hayes, PLLC

(57) ABSTRACT

The subject disclosure pertains to exploitation of sequence information in a workload for the purpose of performance tuning. An optimal or exhaustive approach to tune sequences by mapping to a shortest path problem is provided as well as powerful techniques that result in optimal or nearly optimal solutions. Also disclosed is greedy approach that is much more efficient than the optimal approach and yet also generates solutions of comparable quality. Further yet, systems and methods are provided that facilitate extraction of sequence information and implementation of recommendations.

16 Claims, 19 Drawing Sheets

OTHER PUBLICATIONS

Surajit Chaudhuri and Vivek Narasayya, An Efficient, Cost-Driven Index Selection Tool for Microsoft SQL Server, Proceedings of the 23rd VLDB Conference, 1997, pp. 146-155.

T. Cormen et al., Introduction to Algorithms, 1999, pp. 484-487 and 536-537, 23rd Printing, MIT Press.

Benoit Dageville, et al., Automatic SQL Tuning in Oracle 10g, Proceedings of the 30th VLDB Conference, 2004.

Himanshu Gupta, et al., Index Selection for OLAP, Proceedings of ICDE, 1997.

Michael Hammer and Arvola Chan, Index Selection in a Self-Adaptive Data Base Management System, ACM SIGMOD, 1976.

Oracle Tuning Pack, http://www.oracle.com/technology/products/manageability/database/pdf/ds/tuning_pack_ds_10gr1.pdf, 2004.

Jun Rao et al., Automating Physical Database Design in a Parallel Database, ACM SIGMOD, 2002, pp. 558-569.

Steve Rozen, Automating Physical Database Design: An Extensible Approach, Dissertation in the Department of Computer Science at New York University, Mar. 1993, 125 pages.

Kai-Uwe Sattler et al., QUIET: Continuous Query-Driven Index Tuning, Proceedings of the 29th VLDB Conference, 2003.

TPC Benchmark H: Decision Support Standard Specification, Transaction Processing Performance Council, 1993-2005, 145 pages.

TPC Benchmark H. Decision Support, http://www.tpc.org. Printed Feb. 3, 2006.

Gary Valentin et al. DB2 Advisor: An Optimizer Smart Enough to Recommend Its Own Indexes, Proceedings of ICDE, 2000.

Daniel Zilio et al., DB2 Design Advisor: Integrated Automatic Physical Database Design, Proceedings of the 30th VLDB Conference, 2004, pp. 1087-1097.

Sanjay Agrawal et al., Automated Selection of Materialized Views and Indexes For SQL Databases, Proceedings of the 26th International Conference on Very Large Databases, 2000.

Surajit Chaudhuri and Vivek Narasayya, AutoAdmin "What-If" Index Analysis Utility, ACM SIGMOD, 1998, pp. 367-378.

Surajit Chaudhuri and Vivek Narasayya, Index Merging, Proceedings of ICDE, 1999.

* cited by examiner

OPTIMAL SOLUTION- GRAPH FOR
SINGLE INDEX, N-STATEMENT

COST BASED PRUNING GRAPH

GREEDY SOLUTION- GENERATED
GRAPH FOR JOIN-PAIR

SEQUENCE BASED PHYSICAL DESIGN TUNING

BACKGROUND

A database management system (DBMS) facilitates interaction with database data. The DBMS efficiently manages requests or queries from users and programs so that these entities are free from having to know specifics pertaining to how and where data is physically stored. Furthermore, in handling requests, the DBMS ensures the integrity and security with respect to the data. Although other systems are emerging, the relational database management system (RDBMS) remains the most common DBMS.

Database management systems provide functionality that is essential to development and execution of business applications. Accordingly, DBMS are increasingly employed as a core component in applications. However, at present, the problem of tuning DBMS for achieving required performance is considerable and results in high total cost of ownership (TCO).

The performance of a database system depends crucially on its physical database design. In particular, physical design structures such as indexes, materialized views, and vertical and horizontal partitioning, among other things are selectively employed to improve performance significantly. For example, consider a particular database query issued numerous times throughout a day. If a database view is materialized to capture the query answer, response time can be reduced substantially.

Although typically a database administrator (DBA) is responsible for database tuning, reliance on an automated tool to make good design decisions has become increasingly common and necessary, especially with large-scale deployment of databases. Given a workload on a database system, these automated tools effectively reduce the DBA's burden by recommending a physical database design, which may be refined later, if necessary, and implemented by the DBA.

Automated physical design tuning solutions are currently offered by major database vendors. Conventional design advisors or tools are designed to recommend one or more of indexes, materialized query tables (i.e., materialized views), shared nothing partitions and multidimensional clustering of tables, amongst other structures. In general, conventional techniques adopt the same problem definition, namely given a workload as input recommend a single configuration or physical database design that provides the best overall performance for the entire workload.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to automated physical design tuning. More specifically, a workload is treated as a sequence for purposes of design tuning. Accordingly, ordering information is leveraged between workload statements to ultimately achieve better performance than a conventional set-based approach. In accordance with one aspect of the subject innovation, a system and method are provided for receiving a workflow and associated ordering information and generating a recommendation based on, among other things, the sequence, relevant structures and a maximum storage that one is willing to allocate for the structures. Execution cost of a sequence of statements defining a workload is minimized or substantially reduced upon implementation of the recommendation.

In accordance with an aspect of the subject innovation, an optimal or exhaustive approach is presented for solving a physical design selection problem for sequences. The problem can be formulated with respect to directed acyclic graph (DAG) or representation thereof. A graph can be constructed with a node for every statement and every possible configuration generated from an input set of structures. The cost of a node is the cost of a statement for that configuration, and the cost of an edge is the cost of transitioning between two configurations that defined the edge. Once the graph is produced, the optimal output sequence can be calculated as the shortest path in the graph where the path cost includes the cost of nodes as well as edges.

According to yet another aspect of the innovation, a cost based pruning technique is disclosed to obtain more efficient output than an exhaustive approach. This mechanism prunes or reduces configurations at a given stage in an input sequence while also preserving optimality.

A split and merge mechanism is disclosed in accordance with an aspect of the innovation that also improves the efficiency of producing a tuning recommendation. Disjoint sequences can be generated and solved independent of one another and subsequently merged to produce a final solution.

Additionally, a greedy technique is provided for generating a recommendation, according to an aspect of the innovation. A greedy search scheme is employed that produces optimal or nearly optimal solutions very efficiently by, among other things, identifying configurations of interest in a greedy fashion. This technique scales well for a large number of structures and statements and can thus be employed in lieu of the exhaustive approach under such circumstances.

In accordance with another aspect of the subject innovation, a mechanism and methodology is provided for breaking down a workload into a sequence and/or sequence of sets. This output can then be employed by the tuning system and method to provide recommendations.

According to still another aspect of the innovation, a system and method are provided for implementing recommendations. For example, an implementation component can facilitate inserting an instruction between statements in code to create or drop structures.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
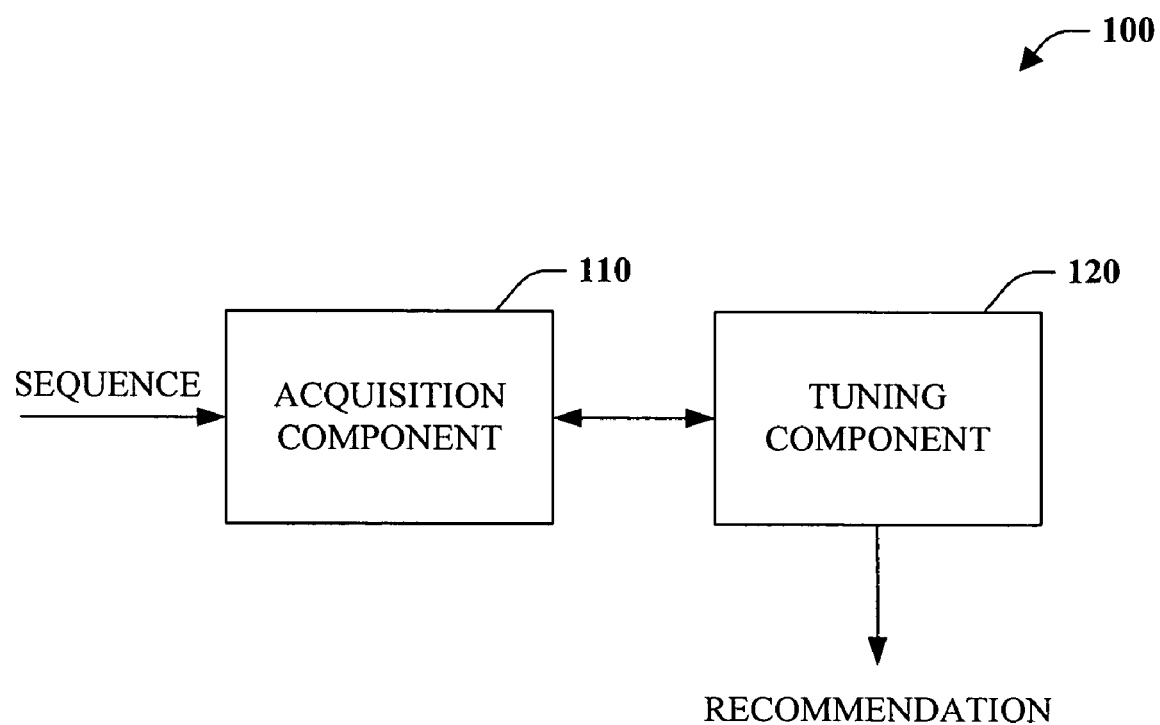
FIG. 1 is a block diagram of a sequence tuning system.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Artificial intelligence based systems or methods (e.g., explicitly and/or implicitly trained classifiers, knowledge based systems . . . ) can be employed in connection with performing inference and/or probabilistic determinations and/or statistical-based determinations in accordance with one or more aspects of the subject innovation as described infra. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

As used herein, a "workload" is a sequence of data manipulation or interaction statements including but not limited to SQL statements such as select, insert, delete and update. Statements can be ordered by monotonically increasing ID (e.g. a timestamp). Herein, a statement in a sequence is often represented as $S_k$ where k denotes its ID. A sequence of N statements $S_1$ through $S_N$ can be denoted by $[S_1, S_2 \ldots S_N]$. In one particular implementation, the workload can be gathered using tracing tools that are available on today's database systems. However, the subject innovation is not so limited.

A "physical design structure" can include but is not limited to a materialized view, an index on table or materialized view, and a partition. A "configuration" is a valid set of physical design structures that can be realized in a database, for example. A structure can be considered relevant for a statement if present, it is considered by a query optimizer during plan generation.

Note that the following notations are also used herein. COST(S, A) denotes the cost of executing statement S for configuration A. Costs can be provided as optimizer estimated costs and what-if extensions that are available in several commercially available database servers. This allows the subject innovation to be robust and scalable. More specifically, numerous alternatives can be tried out during search very efficiently without disrupting normal database operations.

TRANSITION-COST($A_2$, $A_1$) denotes the cost of realizing configuration $A_2$ in a database from configuration $A_1$, that is, the cost of creating and dropping structures to get from configuration $A_1$ to configuration $A_2$, which can be computed using what-if extensions. For example, let $A_1$ contain a single index $\{I_1\}$ and $A_2$ contain a single index $\{I_2\}$. $A_2$ can be realized from $A_1$ by executing the following statements—DROP INDEX $I_1$ and subsequently CREATE INDEX $I_2$. TRANSITION-COST($A_2$, $A_1$) would be the total cost of dropping $I_1$ and creating $I_2$ above.

Execution of a sequence $[S_1, S_2 \ldots S_N]$ is represented as $[A_1, S_1, A_2, S_2 \ldots A_N, S_N, A_{N+1}]$, where $A_i$ is the configuration that is realized in the database prior to executing $S_i$. Note that there is an implicit ordering between $A_i$; $A_i$ is realized before $A_{i+1}$ and so on. Let $A_0$ denote the initial configuration and $A_{N+1}$ denote the configuration that is realized in the database after statement $S_N$ is executed. TRANSITION-COST $(A_{N+1}, A_N)+\Sigma^N_{k=1}$ (COST $(S_k, A_k)$+TRANSITION-COST $(A_k, A_{k-1})$) represents the sequence execution cost of $[A_1, S_1, A_2, S_2 \ldots A_N, S_N, A_{N+1}]$. Note that this cost includes the cost of changing the configurations (TRANSITION-COST component of the cost) during sequence execution.

Referring initially to FIG. 1, a performance tuning system 100 is illustrated in accordance with an aspect of the subject innovation. Tuning system 100 can be employed to among other things tune a database to facilitate efficient application execution. Tuning system 100 includes an acquisition component 110 communicatively coupled to tuning component 120. Acquisition component 110 can receive, retrieve or otherwise obtain or acquire a sequence of statements representative of a workload or in other words a workload with order information. For example, a sequence can be identified explicitly by a user, for instance via a markup language such XML (eXtensible Markup Language) or other mechanism. The following exemplary XML fragment captures an instance of such input. Here, "Workload" is a "Sequence" of "EventStringSet." "EventStringSet" is a set of "EventString" each of which represents a statement in the input.

```
<Workload>
    <Sequence>
        <EventStringSet>
            <EventString> text1 </STATEMENT>
            < EventString > text2 </STATEMENT>
            ...
        </ EventStringSet >
        < EventStringSet >
            <EventString > text3 </STATEMENT>
            < EventString > text4 </STATEMENT>
            ...
        </ EventStringSet >
    </ Sequence >
</ Workload >
```

The obtained sequence can be transmitted from the acquisition component 110 to the tuning component 120 or otherwise accessed thereby.

The tuning component 120 is operable to perform sequence based tuning. Based on the sequence received or retrieved from the acquisition component 110, the initial set of physical design structures currently present and an optional maximum storage allocation for structures, the tuning component 120 can generate a recommendation that upon implementation optimizes or nearly optimizes the execution of the workload represented by the sequence. The output of the tuning component 120, the recommendation, can take many forms. In accordance with one aspect of the innovation, the output can be another sequence that has the following properties: (1) Every statement in the input occurs in the output sequence and in that order; (2) Statements that are part of the output sequence but not present in the input are restricted to be create/drop of physical design structures; (3) At no point during execution of the output sequence is storage exceeded beyond an allocated maximum; and (4) For all possible sequences that can be generated from the input sequence, the output sequence is one that maximizes (or substantially maximizes or improves) performance.

In essence, the tuning component 120 can exploit the relative ordering of statements in a workflow thereby resulting in superior performance of the system 100 as compared with the conventional set based approach, for instance. For purposes of clarity and understanding, consider the following three exemplary scenarios, namely data warehousing, SQL applications that use transient tables, and periodic change on a server.

Figure 2A:
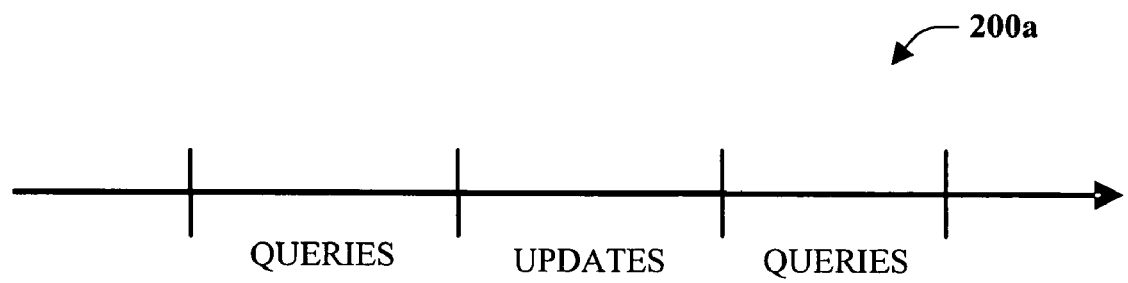
FIGS. 2a-b are exemplary timelines relative to data warehouses.

As per data warehousing, during the day, there are multiple applications that issue complex queries against a warehouse. At night, there is a batch window during which the warehouse data is updated, for example, new data can be inserted. Referring to FIG. 2a, timeline 200a captures the ordering information in data warehouses.

If the workload that includes both queries and updates is tuned as a single set using a conventional set-based approach, it is quite possible that a physical design structure will not be recommended that benefits the workload as a whole. This results because although such a conventional tool may identify structures that speed up queries (during the day), the update cost incurred (at night) for the structures may far outweigh their benefit.

Figure 2B:
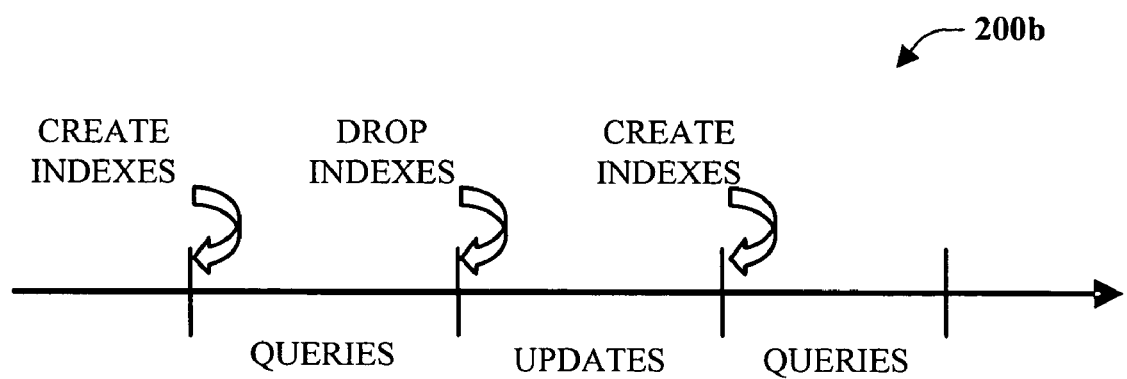

Alternatively, if the workload is treated as a sequence, the system 100 can recommend the following: create structures before the queries arrive and drop such structures before the updates begin. This recommendation provides the benefit of structures for queries but without the update overhead. If the benefit of such structures is greater than the creation cost, the data warehouse scenario can be optimized for performance as shown by timeline 200b of FIG. 2b. Note that performance improvement arises from the fact that the structures are created once, used multiple times in queries and have no maintenance cost as they are dropped prior to update.

Observe that the approach of breaking the workload into two parts, the queries and updates and tuning each without awareness of the other can lead to very sub-optimal performance. This is due to the fact that tuning different parts can lead to very different physical design recommendations for each segment. Such an approach does not take into account the costs of transitioning between the different physical designs recommendations of individual parts. In this example, indexes need to be created for the queries and dropped for the updates. The creation and dropping of indexes can become very expensive at times, for example, the drop of clustered index on a large table may internally lead to recreation of all non-clustered indexes on that table. Therefore, the cost of physical design transitions should be included in the analysis for achieving optimal performance. Hence, the strategy that simply splits the workload can lead to poor physical design recommendations. Similarly one can easily show that an alternative strategy that breaks the above workload into two parts as described above, optimizes the queries first and freezes the output physical design recommendation of queries for the subsequent updates (this reduces the physical design transition cost across parts in the above example to zero) can lead to very poor quality recommendations and is clearly sub-optimal.

Turning attention to the second scenario, many applications use transient or temporary tables in the manner described below.

```
// Step 1: create table
    CREATE TABLE #t (multiple columns TYPES)
// Step 2: populate table
INSERT INTO #t
    SELECT columns FROM Y WHERE column = value
//Step 3: use table in multiple queries
SELECT X.*,#t.*
FROM X INNER JOIN #t ON X.CUSTID = #t.CUSTID
WHERE X. PRODUCTID = value
ORDER BY #t.PRICE DESC
//Step 4: drop table
DROP TABLE #t
```

Again, structures on transient tables can be recommended by leveraging the knowledge as to how such tables are used. In this scenario, just before step 3 and after step 2 above, one can create an appropriate index on the transient table to improve the performance of the SELECT statement. This kind of tuning cannot be achieved by set-based tuning tools since recognizing the sequence of CREATE TABLE (this marks the start of life of transient tables), followed by INSERT then SELECT and finally DROP (this marks the end of life of transient tables) is important.

Figure 3:
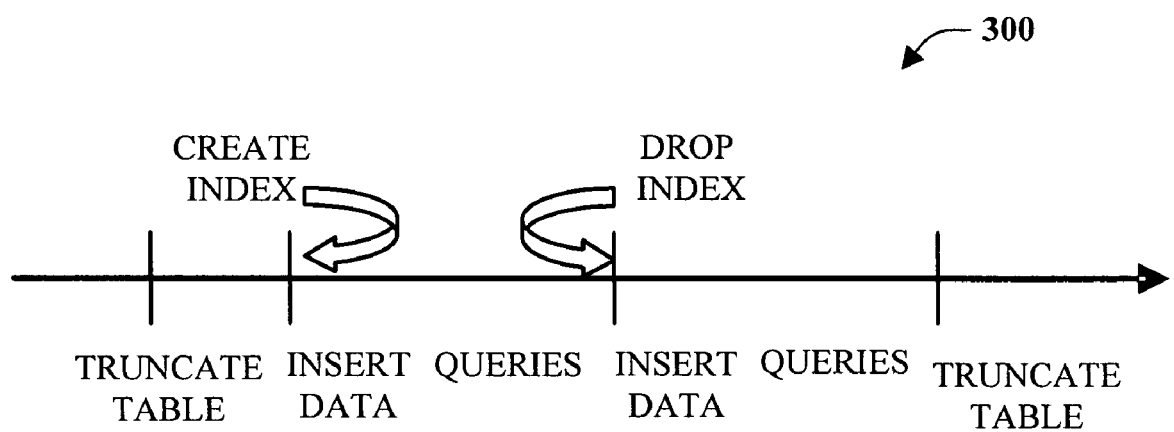
FIG. 3 is an exemplary timeline pertaining to periodic data change.

The third scenario is common in enterprises where data pertaining to a certain time period is available on production servers for the specified duration. For example, the sales table may contain data for the current quarter. The data is populated as follows. At the end of the current quarter, all rows from the table are deleted and subsequently data for the new quarter is inserted into the table. Further, new data is added at the end of each day from different sales sources. Meanwhile, there are queries that run against this data during the entire time period. Timeline 300 of FIG. 3 captures this scenario.

Note that even though the set of queries and updates can remain the same, the same physical design may be useless for a significantly different data size and/or distribution. For example, non-clustered indexes may become useless for seeks if selectivity becomes large. Overheads of inserting rows and benefits of physical design structures are inherently tied to table sizes. A sequence-based approach under such circumstances can capture the dynamic changes of data in a much more realistic manner than a set-based approach and make the right trade offs for suggesting create/drop of structures.

The aforementioned exemplary scenarios highlight the fact that exploiting the order between statements can be crucial for improving performance. Of course in reality, rarely is the workload either a single set or a single sequence. A more general model of a workload is a sequence of sets of statements. If the input is a single instance of a single application, then it can be considered a sequence of single statements. For instance, an input SQL file or trace file with information about a single application/instance will be treated as a sequence of single statements. If there are multiple instances of the same application present in the input or similarly there are multiple applications present, this corresponds to a sequence of sets model. In this instance, if one instance of application has statements S1->S2->S3->S4 and the other has S1->S3->S2->S4, then S1->{S2, S3}->S4 can be generated and physical design changes recommended based on that sequence of sets.

Consider how the sequence of sets of statements fits with the exemplary scenarios supra. As per the first scenario, the workload can be treated as alternate sets of queries (during the day) and updates (during the night). Similarly for the third scenario, sets of queries and inserts alternate in the workload. However, note that in both cases the set of queries alternate with the set of updates and this defines a sequence. Likewise, each statement in scenario two can be viewed as a single statement set, the sets being ordered naturally as the order of steps above.

Another interesting aspect of the subject innovation is that the output model of this sequence-based approach is different from conventional set-based tuning solutions. Unlike with a set-based approach where the output is a single SQL script with creates/drops of structures, for a sequence tuning tool, such a "one script" output is not adequate. Rather, the output contains create and drop of structures interleaved with the input. For example, in the second exemplary scenario above, the output would correspond to "create index on temporary table between the INSERT and SELECT statements" and may require changes in application code.

The problem solved by system 100 and more specifically tuning component 120, can be defined more formally as follows. Given a database D, a sequence workload W=[S1, S2 ... SN], an initial configuration A0 and a storage bound M, find configurations A1,A2, ... AN+1 such that storage requirement of Ai ($1 \leq i \leq N+1$) does not exceed M and sequence execution cost of [A1, S1, A2, S2 ... AN, SN, AN+1] is minimized. The output of the optimization problem above can be another sequence where statements corresponding to create and drop of physical design structures are added to the input sequence [S1, S2 ... SN] such that configurations Ai for i=1 to N+1 are realized as above. If the workload captures the inserts/updates/deletes that happen in the system, the maintenance and update overhead of physical design alternatives are accounted for automatically as part of our optimization problem. Note the cost of changing configurations is integrated in the optimization problem. The initial state can be represented by $A_0=A_1= \ldots =A_N=A_{N+1}$. That is, all the statement costs are calculated relative to initial configuration $A_0$ and there is zero transition cost as all the configurations are the same.

This problem formulation is general enough to handle some common constraints. For example, consider the case where the sequences are generated by individual applications. The applications impact on the underlying databases physical design is desired to be limited to the duration when it is executed such that it does not impact applications that precede or follow that. This can be incorporated by constraining $A_{N+1}=A_0$. This scenario is referred to herein as the transparency constraint. There could be other constraints on the output for enabling deployment in enterprise scenarios. Users may allow physical design changes only at specific parts instead of at any point in the sequence. For example, considering the first exemplary scenario described supra, a user may allow physical design changes to happen only before updates are applied to the warehouse and after updates are done and not during the day when the warehouse is mostly queried. Let $[S_p \ldots S_q]$ denote the statements prior to which such changes are allowed. We can represent this constraint as: For $1 \leq i < q$, $A_i=A_{i-1}$ if $S_i$ is not contained in $[S_p \ldots S_q]$; for $q < i \leq N+1$, $A_i=A_q$ and we have to find configurations $A_p \ldots A_q$. Another significant constraint could be to allow physical design changes that complete within a user specified time window t, that is TRANSITION-COST($A_i, A_{i-1}$)$\leq$t for all $1 \leq i \leq N+1$.

As per the complexity of the problem, if we are provided as input a sequence of N statements and there are M structures, the number of possible configurations is $2^M$ as each subset of structures defines a unique configuration. Hence, there is a total of $2^{M*(N+1)}$ choices as we need to find N+1 configurations $A_1, A_2, \ldots A_{N+1}$. By contrast, there are $2^M$ possible configurations with set-based tuning approaches. The set-based tuning approach can be viewed as a constrained version of the disclosed sequence-tuning, where physical design changes are only allowed at the beginning of the sequence.

Figure 4:
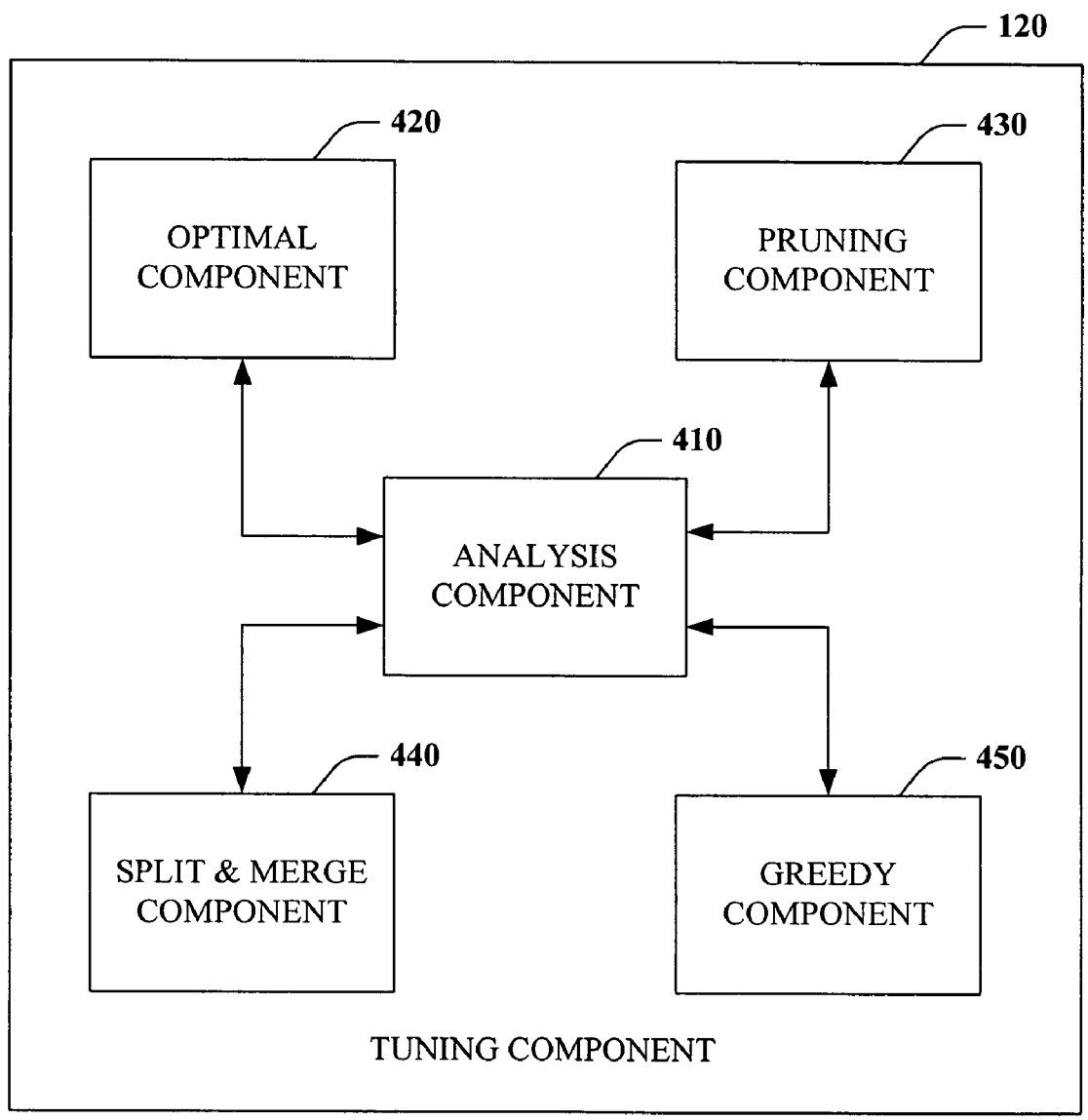
FIG. 4 is a block diagram of a tuning component.

Referring to FIG. 4, a tuning component 120 is illustrated in accordance with an aspect of the subject innovation. As previously described, the tuning component 120 provides sequence-based tuning and generation of a recommendation. The tuning component 120 includes an analysis component 410 communicatively coupled to optimal component 420, pruning component 430, split and merge component 440 and greedy component 450. The analysis component 410 analyzes a given sequence and determines beneficial and often optimal physical design structures that can be employed therewith. To facilitate such analysis the component 410 can interact with or coordinate interaction amongst one or more of the communicatively coupled components 420-450 as will be described in further detail infra.

Optimal component 420 can identify the optimal solution or recommendation for a given sequence and set of structures. The goal of the optimal component 420 is to add "create" and/or "drop" statements with respect to design structures to the input sequence such that the overall performance of the generated sequence is maximized. This can be approached as a shortest path problem over a directed acyclic graph (DAG) defined over the input sequence.

The optimal component 420 can first generate a representation of a DAG for use in analysis. The graph can be an N-staged graph, each stage representing a statement in the input sequence. For every statement in the input sequence (every stage), a node is generated for every possible configuration (set of structures) that can be generated from the input set of structures. The cost over every node is the cost of the statement for that configuration or more specifically COST (S, A), where S represents a statement and A represents a configuration. Additionally, two nodes source and destination can be generated and added to the graph to represent the initial and final configuration and having a cost of zero. The source node precedes the first statement in the input sequence and destination succeeds the last statement in the input sequence. The cost of an edge is the cost of transitioning between configurations as represented by the nodes that define the edge.

To facilitate clarity consider the following simple example. Assume the input sequence has N SQL statements. The set of structures that are of interest is a single index I. The goal is to find N+1 configurations ($A_1 \ldots A_{N+1}$) as described in previous identified. In this exemplary case assume there are two possible configurations: (1) Empty configuration { }; and (2) Single index configuration {I}. There are two costs associated with each statement $S_i$, that is COST ($S_i$,{ }) and COST ($S_i$,{I}).

Figure 5:
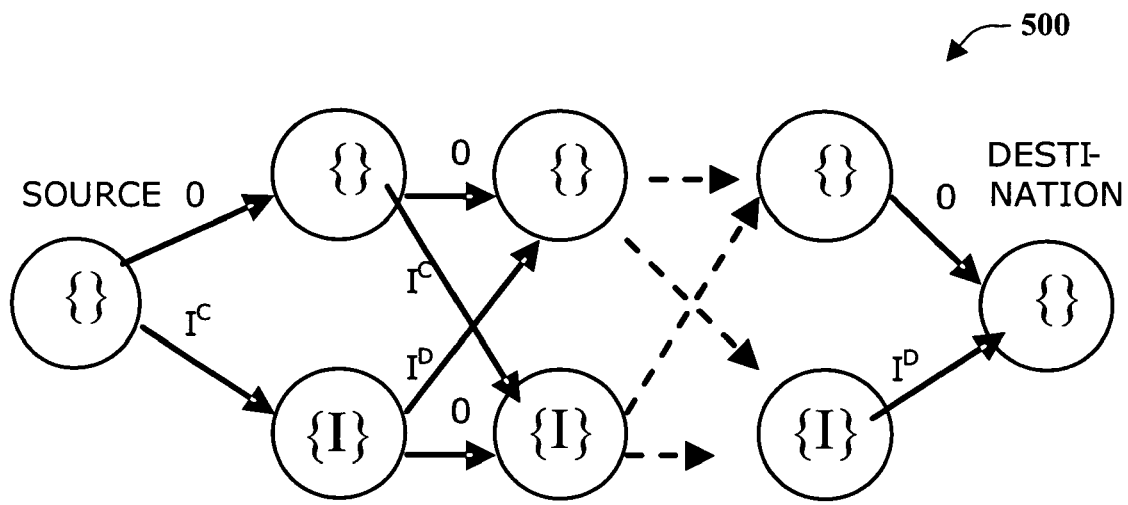
FIG. 5 is a direct acyclic graph for a single index and N-statement.

Referring to FIG. 5 a graph 500 is provided for a single index and N-statement. For every statement in the input sequence and for every possible configuration generated from the input set of structures a node n is generated representing a statement S, configuration A pair with a cost=COST (S, A). The two nodes source and destination representing the initial and final configuration are added to the graph and have a cost of zero. Thus there are 2*N+2 nodes in the graph corresponding to the current example (there are two possible configurations { } and {I}). The graph has N+2 stages; a stage for each statement, source and destination. We refer to source as 0-th stage and destination as (N+1)-th stage.

The edges are directed and are between all nodes in stage k to all nodes in stage k+1 ($0 \leq k \leq N$). Let edge e=($n_1$, $n_2$) represent the edge from node $n_1$=(*, A) to node $n_2$=(*, B), where * denotes that it could be any statement. Then cost of e=TRANSITION-COST(B, A). In the current example, there are 4*N edges and the costs of the edges can be (1) zero when there is no change in configuration between nodes that define the edge; (2) cost of creating the index $I^C$ when transitioning from { } to {I}; and (3) cost of dropping the index $I^D$ when transitioning from {I} to { }.

If the final configuration denoted by $A_{N+1}$ is constrained to be the same as initial configuration denoted by $A_0$, then the appropriate edge cost is assigned between the nodes in stage N and destination node, see graph 500. However if there are not any constraints on the final configuration and the best possible solution desired, a cost of zero to all the edges between the nodes in the stage N and destination node. In graph 500, this would correspond to assigning edge costs of zero between all nodes in $S_N$ and destination, and $A_{N+1}$ will be the same as $A_N$.

Once the graph is constructed as described supra, the optimal output sequence is the shortest path in this graph where the path cost includes the cost of nodes as well as edges. The equivalence between the shortest path in the graph above and sequence execution cost is straightforward as the node costs represent COST ($S_k$, $A_k$) and edge costs represent TRANSITION-COST ($A_k$, $A_{k-1}$). Note the following properties of the exemplary graph 500. First, the cost of nodes and edges are non-negative and second, the graph has 2*N+2 nodes and 4*N edges. The shortest path in this graph can be computed very efficiently by optimal component 420 any number of conventional source shortest path technique for DAGs in linear complexity as number of both edges and nodes are O(N). The intuition behind the linear complexity is that each edge needs to be examined exactly once to arrive at the solution.

Generalizing the graph to N-statement sequence and M structures to generate an optimal solution is straightforward. In each stage 1 through N, there are $2^M$ nodes each representing a configuration. This is because each subset of input structures defines a configuration. The solution that enumerates all $2^M$ configurations exhaustively is referred to as exhaustive. It is important to note that the graph has O(N*$2^M$) nodes and O(N*$2^{2M}$) edges. That is, the graph is exponential in the number of input structures. Though the shortest path can be solved in linear complexity of number of nodes and edges as above, these however are exponential in number of structures.

It is noted that if the system is provided an input of small number of structures, the optimal component 420 can apply exhaustive to get an optimal solution. However, it becomes impractical for large sequences that typically have hundreds (or more) of structures and the graph subsequently generated is exponential in number of structures. The increased number of nodes not only demands much higher space requirements but also has a significant adverse impact on performance in another subtle way, namely to get the cost of each node (recall that each node represents a statement and a configuration) a costing module or component is invoked which can be the query optimizer itself.

Turning back to FIG. 4, the analysis component 410 can also interact with the pruning component 430. The pruning component 430 facilitates the pruning or removal of configurations at a given stage in the input sequence while preserving optimality. The intuition behind this technique is that optimal solutions of individual structures can be leveraged to significantly prune nodes at various stages in the graph that would otherwise be generated by the optimal component 420 or exhaustive approach described above.

SPS (structure s) for a structure s refers to the shortest path solution that is generated by optimizing the entire sequence for s alone. Let $[b_1, S_1, b_2, S_2 \ldots b_N, S_N, b_{N+1}]$ represent the solution SPS(s) where $b_i$ represents configurations. Let $[A_1, S_1, A_2, S_2 \ldots A_N, S_N, A_{N+1}]$ represent the solution where $A_i$ represents configurations that are produced by running a shortest path algorithm over the graph that has all the configurations (i.e., exhaustive). If there are no interactions across structures, that is, for every statement, the benefits of structures are independent of the presence of other structures, then the following claim holds: $s \notin b_k$ in SPS(s) $\Rightarrow s \notin A_k$ for every structure s and stage k (k=1 to N).

This can be proved by contradiction. Assume that there exists a structure s where k is the first stage such that $s \in A_k$ but $s \notin b_k$. All the costs are non-negative. Consider the following notations:

$I^C$ as the creation cost for s.
$I^D$ as the drop cost for s.
$C_1 = COST(S_k, A_k)$
$C_2 = COST(S_k, A_k - \{s\})$ where $A_k - \{s\}$ is the configuration one gets by removing s from $A_k$.
$P_1 = COST(S_k, \{s\})$
$P_2 = COST(S_k, \{\})$ Since benefits are independent $P_1 - C_1 = P_2 - C_2 \Rightarrow P_1 - P_2 = C_1 - C_2$. All cases are enumerated as follows:

$s \in A_{k-1}$: Then $C_1 < I^D + C_2$ must hold as exhaustive would not pick $A_k$ otherwise. If $s \in b_{k-1}$, then $P_1 > I^D + P_2 \Rightarrow P_1 - P_2 > I^D \Rightarrow C_1 - C_2 > I^D$ results in a contradiction. The other case $s \notin b_{k-1}$ cannot occur, as k is the first stage where violation occurs.

$s \notin A_{k-1}$: Then $I^C + C_1 < C_2$ must hold. If $s \in b_{k-1}$, then $P_1 > I^P + P_2 \Rightarrow P_1 > P_2 \Rightarrow C_1 > C_2$ results in a contradiction. If $s \notin b_{k-1}$, then $P_1 > P_2 \Rightarrow C_1 > C_2$ again results in a contradiction.

Also note that $A_{N+1} = A_N$ in the original optimization problem (or equals $A_0$ in transparency constrained problem) and the proof holds for stage N+1. This allows us to eliminate structures (and configurations that contain these) at a given stage as follows. The SPS is run for all structures and their respective solutions at each stage analyzed. For a given stage k, a set of structures $R = \{s | s \in b_k \text{ in SPS(s)}\}$ is constructed. Note that every subset c of R defines a unique configuration and is added to the graph as node $(S_k, c)$ if configuration c obeys the storage bound.

Figure 6:
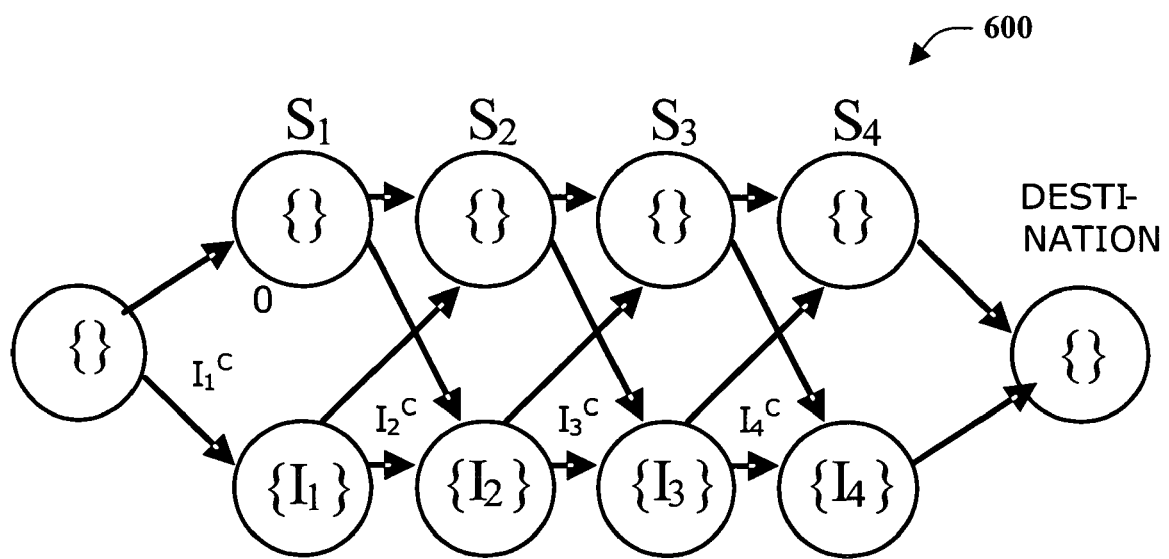
FIG. 6 is a cost-based pruning graph.

Let us apply this to an example. Assume that the input sequence has four statements $[S_1, S_2, S_3, S_4]$. Also for statement $S_i$ index $I_i$ (i=1, 2, 3 and 4) and no other index is relevant and the drop cost of every index is zero. Using exhaustive all $2^4 = 16$ configurations will be enumerated to find the optimal solution. By looking at optimal solutions on a per structure basis i.e. $SPS(I_1) = [\{I_1\}, S_1, \{\}, S_2, \{\}, S_3, \{\}, S_4, \{\}]$, $SPS(I_2) = [\{\}, S_1, \{I_2\}, S_2, \{\}, S_3, \{\}, S_4, \{\}]$ and so on, it is determined that only $I_i$ is present in stage i. Thus, a "reduced" graph can be constructed with only five configurations as depicted by graph 600 of FIG. 6 (the unlabeled edges represent a cost of zero). The solution generated on this reduced graph is optimal.

Next interactions can be accounted for as follows. There are two kinds of interactions: (1) The benefit of a structure can increase due to presence of other structures (e.g., when performing sort merge join, if both inputs are sorted on join keys, the join proceeds much faster than if only one of the input is sorted). Such interactions generally occur within a query (sometimes this is referred to as intra-query interactions); (2) In the other kinds of interactions, the benefit of a structure is reduced due to presence of other structures. These kinds of interactions can occur both within a query and across queries. For the cases where the benefit can increase specifically (1) above, the cost of a structure s can be assigned for statement $S_k$ as follows. For $S_k$, all configurations that contain s are analyzed to find the configuration with the least cost and assign that cost to s. It is interesting to note the some approaches can provide this information without the need for extra computations or optimizer calls. However, if the above information is absent, the lower bound of the cost of $S_k$ is used instead, which can be obtained by probing an optimizer once though this may not result in as significant a pruning as the previous case. Note that for the (2) above the cost of the $S_k$ is reused when only s is present.

Once the assignment of cost is done in this manner, the configurations can be pruned by pruning component 430, as described above. It should be noted that the claim above remains true when the assignment of the costs to individual structures is done as described above even in the presence of interactions. The argument is very similar as for the independent structure case. The notation from the proof above is reused. It is assumed that the optimizer is well behaved; for a query, the addition of a structure to a configuration can never increase the cost of the statement. For the case where $s \in A_k$ and $s \in b_{k-1}$, we get the following: $C_1 - C_2 < P_1 - P_2 \Rightarrow (C_1 - P_1) + (P_2 - C_2) < 0$. However, $C_1 >= P_1$ due to the way assign costs are assigned above and $P_2 >= C_2$ for queries. This leads to a contradiction. The proof for other cases is similar and therefore is omitted for purposes of brevity. The updates/inserts/deletes can be visualized as follows: the update is split into a query part, which identifies the specific rows that need to be updated quickly and is treated as a query. There is a subsequent maintenance part where the updates are applied on the structures. For the update part, it is assumed that the independence assumption holds. That is, the cost of updating a configuration is the sum of update costs of structures contained in the configuration.

The cost based pruning technique executed by pruning component 430 works very well when $s \in b_k$ in SPS(s) for few values of k. This happens when there is significant number of updates/inserts/deletes in the input sequence or in the presence of transparency constraint. The advantage of this technique is that its optimality preserving and has close to zero overhead as the cost of nodes required for this have to be computed anyway and the shortest path computation is extremely efficient for single structures.

As described previously, the efficiency of the solution of the subject innovation depends on the number of input structures, which in turn depends on the statements in the sequence. In enterprises, it is expected that users will provide large sequences as input. These could be trace files collected by tracing the server activity and could be over a period of days with hundreds or thousands of statements that touch different parts of a database. The question becomes, can the fact that groups of statements access different parts of data be leveraged to reduce the search space and enable efficient tuning without compromising quality?

Figure 7:
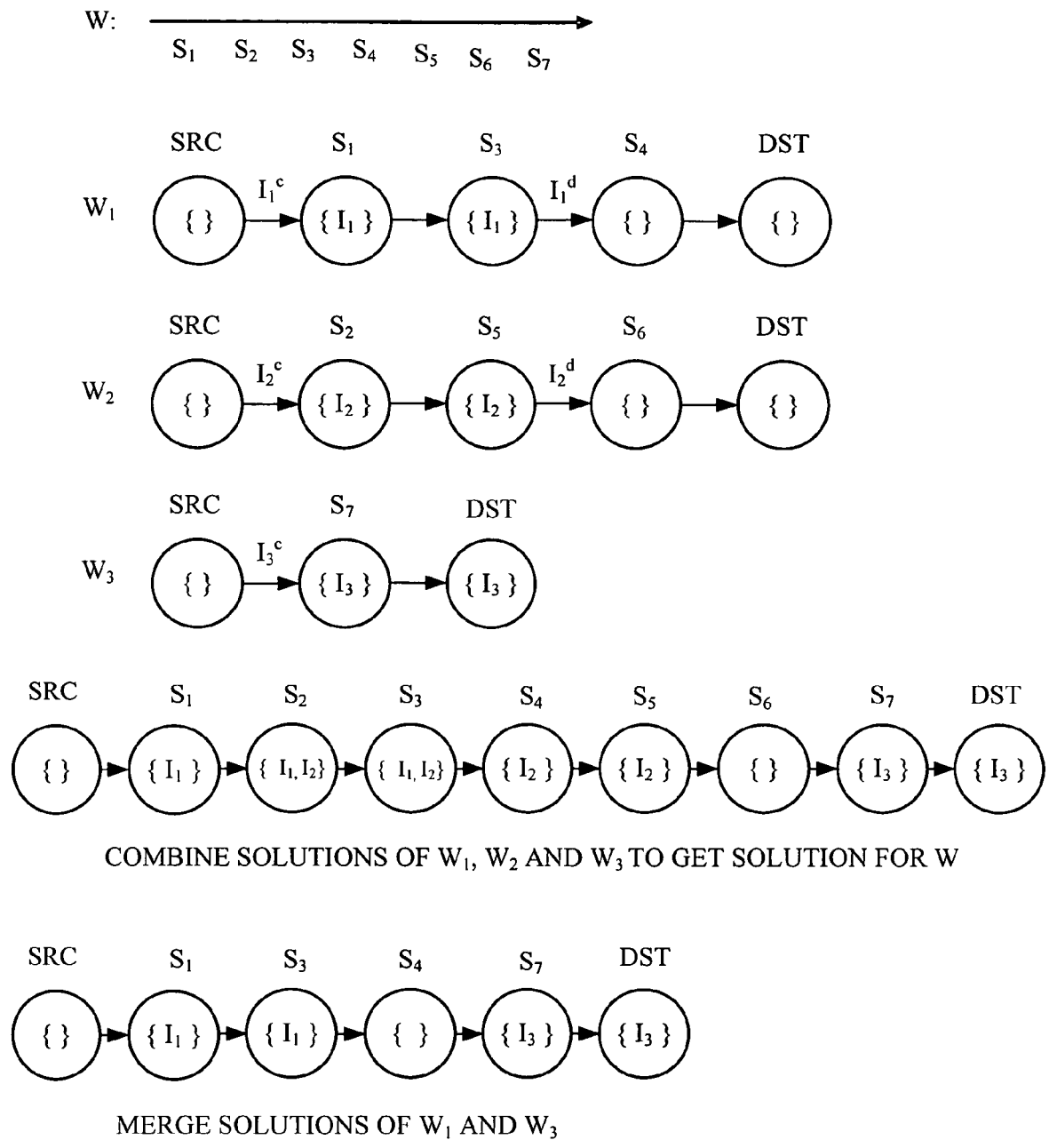
FIG. 7 illustrates an exemplary workload split and merge.

This should become clear upon consideration of an example. FIG. 7 shows an input sequence workload $W = [S_1, S_2 \ldots S_7]$. Assume that structure $I_1$ is relevant for $S_1$, $S_3$ and $S_4$ only (e.g., these statements reference table A only), $I_2$ is relevant for $S_2$, $S_5$ and $S_6$ (e.g., these statements refer table B only) and $I_3$ is relevant for $S_7$ only (e.g., it is on table C). $S_4$ and $S_6$ are updates on the tables A and B respectively. Applying exhaustive on S with input structure set $\{I_1, I_2, I_3\}$ would enumerate $2^3 = 8$ configurations. If a cost-based reduction is applied as previously discussed, the number of configurations can be reduced significantly. However, at $S_2$ and $S_3$, we still need to consider the configurations corresponding to all the subsets of $\{I_1, I_2\}$ a priori as both $I_1$ and $I_2$ are present in stages 2 and 3. Note that $I_1$ and $I_2$ are on different parts of the database and are relevant for different statements in the sequence. The interesting question is whether generating such configurations up front can be avoided and if possible at all. It turns out that for the above sequence the subject innovation can do much better as described below.

The notion of disjoint sequences is defined. Two sequences X and Y are said to be disjoint if: (1) X and Y do not share any statements; and (b) no statement in X shares any relevant physical design structure with any statement in Y. What that means is that given a physical design structure s, all the relevant statements corresponding to s are present in only one such sequence; that is, its impact is limited to one sequence. On applying this to our current example whether we create or drop index $I_2$ on table B cannot impact the cost of statements in $W_1$ (recall that $S_1$, $S_3$ and $S_4$ are on table A). Note that disjoint sequences may be interleaved with respect to how these occur in the original sequence ($W_1$ and $W_2$ in FIG. 7 are interleaved as $S_2$ in $W_2$ starts before $W_1$ ends).

It may be tempting to suggest that we can "break" the input sequence into a set of disjoint sequences, solve each one independently as the choice of configurations in one disjoint sequence does not impact choices for other sequences and "combine" the results to get the globally optimal solution. Unfortunately, stated as such, this is not correct. Suppose we do not have sufficient storage for both $I_1$ and $I_2$. If we use the strategy above we get $\{I_1, I_2\}$ at $S_2$ and $S_3$ by combining individual solutions of disjoint sequences $W_1$, $W_2$ and $W_3$ as shown in FIG. 7 which is not valid. On the other hand, if there is enough storage for $\{I_1, I_2\}$ then the solution shown in FIG. 7 is indeed optimal.

To recap, in the "combined" solution $[A_1, S_1 \ldots S_N, A_{N+1}]$ generated above if $A_i (1 \leq i \leq N+1)$ obeys the storage constraint then the resulting solution is optimal. However, if there are configurations in the "combined" solution that violate the storage bound, then the solution is not valid but provides a lower bound on the cost that we can get in an optimal solution. Now, take a look at the efficiency aspect of the above approach. It turns out that the approach above can lead to much better performance than the alternative approach that tunes the input as a single sequence. Note that each disjoint sequence in our example is solved for just one index ($W_1$ for $I_1$), we never need to consider configurations like $\{I_1, I_2\}$ and we still get an optimal solution if there is no storage violation.

Referring back to FIG. 4, the tuning component 120 includes a split and merge component 440. Component 440 takes an input a sequence and the relevant set of structures and splits it into a set of disjoint sequences. Subsequently, the component 120 executes a merge that takes as input a set of solutions corresponding to disjoint sequences and combines it into one solution.

The algorithm and executing mechanism to generate a split is straightforward. For every structure the set of statements that are relevant are determined by looking at the syntactic structure of statements. Consequently, for every statement, the set of relevant structures is known. The split is achieved by performing a transitive closure over the statements as follows: First, start with each statement as a separate sequence. With every sequence, associate its relevant set of structures. Second, if two sequences share any structure, combine them into one sequence (union of the statements) and union their set of structures. Third, continue step two until no more sequences can be combined. At the end, the input sequence is split into a set of disjoint sequences that share neither any statements nor any structures. In the example above, the input sequence W is split into three disjoint sequences $W_1 = [S_1, S_3, S_4]$, $W_2 = [S_2, S_5, S_6]$ and $W_3 = [S_7]$ with relevant structure sets $\{I_1\}$, $\{I_2\}$ and $\{I_3\}$ respectively.

As per the merge, let $P = \{p_1, \ldots p_m\}$ represent the set of solutions where $p_i$ corresponds to the solution for $W_i (1 \leq i \leq m)$ that is provided as input to a merge operator. The output of merge is a solution that has all the statements from input disjoint sequence solutions and the configurations are union of configurations of $W_i$ at various stages. Let S represent the sequence over the set of statements $\{S_k | \exists i \text{ s.t. } 1 \leq I \leq m \text{ and } S_k \text{ is contained in } W_i\}$ where each statement occurs in some input disjoint sequence $W_i$. In the current example, if we have solutions of $W_1$ and $W_3$ as input to merge, S would be the sequence $[S_1, S_3, S_4, S_7]$ defined over all the statements in $W_1$ and $W_3$. For simplicity, S can be represented by an equivalent sequence $T = [T_1, \ldots T_f]$, where f is the total number of statements in S and the values of i in $T_i$ are consecutive. In the present case, $T_1 = S_1$, $T_2 = S_3$, $T_3 = S_4$ and $T_4 = S_7$. Thus, any input $W_i$ solution can now be represented over the equivalent $T_i$ instead of $S_k$. The solution of $W_3$, which is $[\{I_3\}, S_7, \{I_3\}]$ is now represented as $[\{I_3\}, T_4, \{I_3\}]$. Let $q_i$ represent the equivalent solutions for $p_i$.

In the first step, we extend $q_i$ over all statements in T, for $[T_1 \ldots T_f]$ as follows. Let $[b_u, T_u \ldots b_v, T_v, b_{v+1}]$ represent the solution $q_i$ for a given disjoint sequence $[T_u \ldots T_v]$ and the corresponding extended solution be $[a_1, T_1 \ldots T_f, a_{f+1}]$. The configurations $a_j$ are arrived to as follows. For $1 \leq j \leq v$, if $T_j$ is contained in $[T_p \ldots T_q]$ then $a_j = b_j$ otherwise $a_j = a_{j-1}$. For $v < j \leq f+1$, $a_j = b_{f+1}$. On applying this to $q_3 = [\{I_3\}, T_4, \{I_3\}]$ for $[T_1, T_2, T_3, T_4]$ we get the extended solution=$[\{ \}, T_1, \{ \}, T_2, \{ \}, T_3, \{I_3\}, T_4, \{I_3\}]$.

Once all the extended solutions for all the input disjoint sequences have been obtained, they can be combined as follows. Let $[a_{i1}, T_1 \ldots T_f, a_{if+1}]$ represent the extended solution for $q_i$ and $[A_1, T_1 \ldots T_f, A_{f+1}]$ represent the solution we get by applying combining the extended solutions of all $q_i$. The configurations $A_j = \cup_{i=1 \text{ to } m} a_{ij}$ for $1 \leq j \leq f+1$. The output of merge is the equivalent sequence where $T_i$ are substituted back with equivalent $S_k$. On applying this to the extended solutions for $q_1$ (for $W_1$) and $q_3$ (for $W_3$) in our current example, we get $[\{I_1\}, T_1, \{I_1\}, T_2, \{ \}, T_3, \{I_3\}, T_4, \{I_3\}]$ that is equivalent to $[\{I_1\}, S_1, \{I_1\}, S_3, \{ \}, S_4, \{I_3\}, S_7, \{I_3\}]$ which is the output of merge. See the equivalent graph in FIG. 7. Also, note the following important property of merge: it is disjoint preserving. If $W_i$, $W_j$ and $W_k$ are disjoint sequences ($i \neq j \neq k$), the sequence corresponding to the output of merge of $W_i$ and $W_j$ will still be disjoint with $W_k$.

The split operation is employed to identify the set of disjoint sequences in the input sequence W. Let $W_i (1 \leq i \leq m)$ represent m disjoint sequences corresponding W. Next we propose a greedy approach that can generate globally optimal solution from the set of disjoint sequences as follows. First, find the optimal solution for each $W_i$ separately. Let $p_i$ represent the solution for $W_i$ and $P = \{p_1, \ldots p_m\}$ represent this set of solutions. Second, if there is a single element p in P, output p as the final solution. Pick a pair of solutions, referred as $p_i$ and $p_j$ from P($i \neq j$). Apply merge on $p_i$ and $p_j$ to get $p_{ij}$. If storage constraint is not violated, $p_{ij}$ is already optimal. If $p_{ij}$ violates the storage constraint, combine the two sequences corresponding to $p_i$ and $p_j$ (do not treat these as disjoint) and re-compute the optimal solution $p_{ij}$ for the new sequence. Remove $p_i$ and $p_j$ from P and add $p_{ij}$ to P. Third, repeat step two.

The strategy described above is optimal but causes re-computations when storage constraint is violated in step two. In the example above, assume that the storage required for $I_1$ and $I_2$ together exceeds storage bound. In that case, applying merge on set of individual solutions may not lead to valid solutions. We could of course use the technique discussed above to combine the sequences $W_1$ and $W_2$ (it results in

[S$_1$, ... S$_6$] which is almost the entire input sequence) and re-optimize it as a single sequence, but that may turn out to be very expensive.

In accordance with an aspect of the subject innovation, a split and merge technique is provided that allows reuse of solutions of disjoint sequences to generate a solution for the entire input sequence very efficiently that obeys storage constraints. In many cases, it leads to nearly optimal solutions. This is based on the following observation. The solutions in the regions where storage bounds are not violated remain optimal as long as the preceding and following configurations remain unchanged. This is guaranteed by the shortest path algorithm.

Consider the application with respect to our current example. The individual solutions and solution after merge of disjoint sequences $W_1$, $W_2$ and $W_3$ are shown in FIG. 7. Assume that we have sufficient storage for only one index and hence configuration $\{I_1, I_2\}$ is not valid. In this case, the storage bound is violated at stages 2 and 3 or for sequence [S$_2$, S$_3$]. $A_1=\{I_1\}$, $A_2=A_3=\{I_1,I_2\}$, $A_4=\{I_2\}$ and so on in the solution we obtain after merge of solutions of $W_1$, $W_2$ and $W_3$ denoted by $W_u$ i.e. [$\{I_1\}$, S$_1$, $\{I_1,I_2\}$, S$_2$, $\{I_1,I_2\}$, S$_3$, $\{I_2\}$, S$_4$, $\{I_2\}$, S$_5$, $\{\,\}$, S$_6$, $\{I_3\}$, S$_7$, $\{I_3\}$]. If we locally optimize [S$_2$, S$_3$] to get a solution that respects the storage bound and SOURCE=$\{I_1\}$ and DESTINATION=$\{I_2\}$, we preserve the optimality of solutions of [S$_1$] and [S$_4$, S$_5$, S$_6$, S$_7$]. Here, if the benefit of indexes $I_1$ and $I_2$ far outweigh their create costs, then optimizing [S$_2$, S$_3$] with SOURCE=$\{I_1\}$ and DESTINATION=$\{I_2\}$ would lead to [$\{I_2\}$, S$_2$, $\{I_1\}$, S$_3$, $\{I_2\}$]. In the final act, the locally optimal solutions of [S$_1$] (from $W_u$), [S$_2$, S$_3$] (computed locally as above) and [S$_4$, S$_5$, S$_6$, S$_7$] (from $W_u$) can be combined to get the final solution as [$\{I_1\}$, S$_1$,$\{I_2\}$,S$_2$,$\{I_1\}$,S$_3$,$\{I_2\}$,S$_4$,$\{I_2\}$,S$_5$,$\{\,\}$,S$_6$,$\{I_3\}$,S$_7$,$\{I_3\}$].

The main acts performed can be summarized in three steps. First, identify disjoint sequences $W_i(1\leq i\leq m)$ in input sequence W. Find optimal solution for each $W_i(1\leq i\leq m)$ that obeys the storage bound M. Second, generate a solution $W_u$ by applying merge over solutions of all $W_i(1\leq i\leq m)$. If there are no storage violations in $W_u$, output $W_u$ as it is optimal. Finally, identify ranges in $W_u$ stages where storage violations occur. Optimize each violating range locally to generate $W_f$. Output $W_f$.

Note that sequence execution cost of $W_u$ denoted by $C_u$ is a lower bound on the cost that we can get for any optimal solution that obeys the storage bound. If the cost of the solution obtained by applying split and merge (denoted by $C_f$) is close to $C_u$ then we have a very good solution at hand, as we know that the optimal will be between $C_f$ and $C_u$.

As previously discussed, the number of configurations (and hence nodes and edges in our graph) can be exponential in number of structures. This makes it infeasible in many enterprise scenarios where large number of structures and statements are common. Returning briefly to FIG. 4, the tuning component 120 includes a greedy component that executes a greedy search scheme (also referred to herein as GREEDY-SEQ) that scales very well for large number of structures and statements. It allows lazy generation of configurations and construction of the graph (or representation thereof) in a bottom up manner instead of materializing the entire graph up front.

Figure 8:
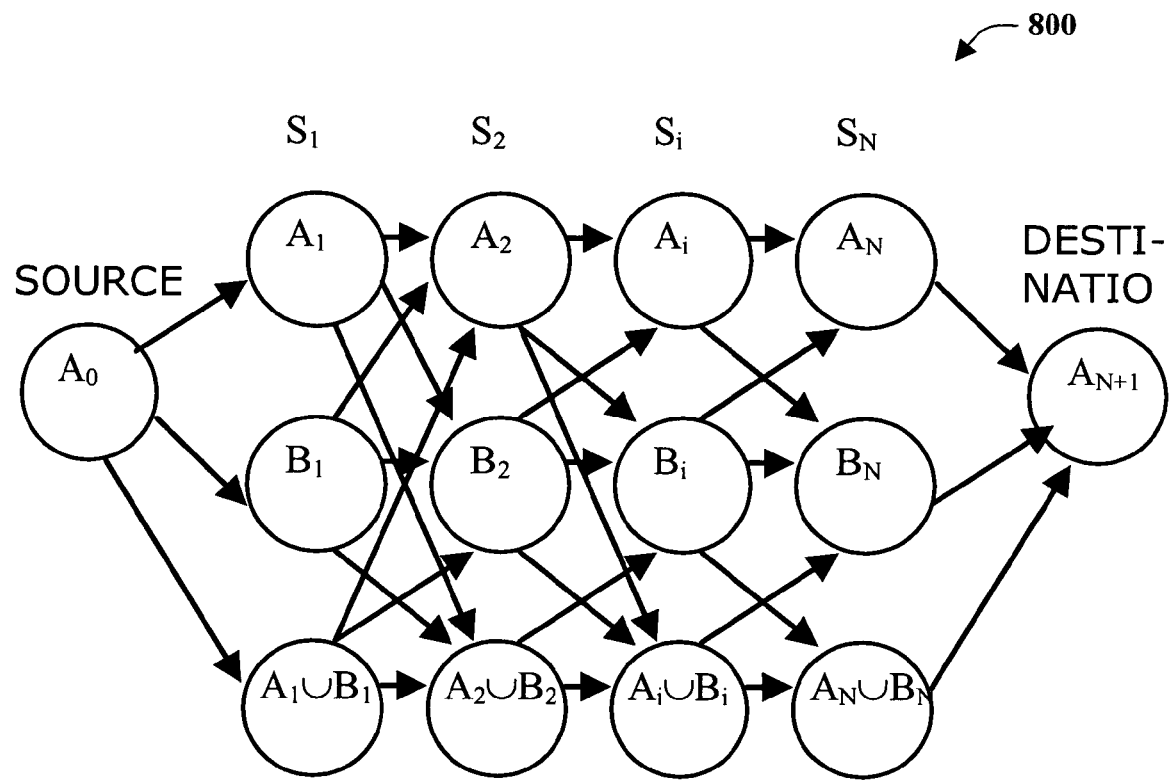
FIG. 8 is a greedy solution graph for join pair.

The operation union-pair is defined as follows; it takes as input two solutions, denoted by $r=[A_1,S_1 \ldots S_N,A_{N+1}]$ and $s=[B_1,S_1 \ldots S_N,B_{N+1}]$ and generates a new solution as described below. Initially, a graph is constructed that has all the nodes (and edges) from the two input solutions r and s. Additional nodes (and edges) that correspond to the union of configurations at various stages (and transition between them) are generated and added to the graph. FIG. 8 represents the generated graph 800 for the above input pair. The output of union-pair is the shortest path solution in the generated graph. Note that if $t=[D_1,S_1 \ldots S_N,D_{N+1}]$ represents the output, $D_i$ is either $A_i$ or $B_i$ or $A_i \cup B_i$.

The following properties of union-pair are observed. The configurations ($A_i \cup B_i$) added at individual stages preserve the benefits of the individual configurations ($A_i$ and $B_i$). However, these require more storage and have worse update characteristics. Since we preserve the original configurations ($A_i$ and $B_i$) before rerunning the shortest path to get the output of union-pair, the update overheads of such configurations get accounted for automatically in the subject strategy. Another reason for sub-optimality arises when some of these configurations ($A_i \cup B_i$) do not fit within the storage bound. In that case, the best configuration that has structures from $A_i \cup B_i$ and fits within the storage bound can be found. There are existing techniques that discuss how to do that efficiently and can be incorporated directly into the subject approach.

Union-pair can be employed build a greedy solution. The individual acts of GREEDY-SEQ are as follows. First, for every structure in the set $S=\{s_1, \ldots s_M\}$, find the optimal solution using the graph formulation. At this point, we have a set of solutions P for individual structures. Let $P=\{p_1, \ldots p_M\}$ and $p_i=[a_{i1},S_1 \ldots S_N,a_{iN+1}]$. Let $C_i = \cup_{j=1 \, to \, N+1} \, a_{ij}$. $C=\cup_{i=1 \, to \, M} C_i$.

Next, run a greedy search over P as follows. (a) Let $r=[A_1, S_1 \ldots S_N,A_{N+1}]$ represent the least cost solution in P. $C=C\cup\{Aj|1\leq j\leq N+1\}$. $P=P-\{r\}$. (b) Pick an element s from P such that t=union-pair(r,s) has the minimal sequence execution cost for among all elements of P and sequence execution cost of t is less than that of r. If no such element exists, go to the third act. $P=P-\{s\}$. $P=P\cup\{t\}$. Go back to a.

Thirdly, generate the graph with all the configurations in C. Run the shortest path to get the final solution.

Now, take a look at how GREEDY-SEQ works in the following example. Assume that the input sequence has eight statements [S$_1$, S$_2$, S$_3$, S$_4$, S$_5$, S$_6$, S$_7$, S$_8$], input set of structures is $\{I_1, I_2, I_3, I_4\}$ and storage is infinite. Also for statements $S_i$ and $S_{4+i}$ index $I_i(1\leq i\leq 4)$ and no other index is relevant and that the benefit of every index for the relevant statement is greater than its creation (and drop) cost. Also assume that the cost using index $I_i<I_{i+1}(1\leq i\leq 3)$. The exhaustive approach in conjunction with cost-based pruning would still lead to $2^4$ configurations at stage four. Utilizing GREEDY-SEQ in act three above we have eight configurations only and we still get the optimal solution; $\{\,\}, \{I_1\}, \{I_2\}, \{I_3\}, \{I_4\}, \{I_1, I_2\}, \{I_1, I_2, I_3\}$ and $\{I_1, I_2, I_3, I_4\}$. In act two, we do need to look at a few more configurations but the over all number of generated configurations is much smaller than exhaustive. It should be noted that the greedy approach results in close to optimal solutions and with significantly better performance compared to exhaustive.

It should be appreciated that GREEDY-SEQ is sub-optimal as the following example clearly demonstrates. Table 1 below shows the cost of four statements in the sequence for various indexes. Assume that the storage available is 100 MB and that $I_1$ requires 80 MB, $I_2$ and $I_3$ require 40 MB each. GREEDY-SEQ returns [$\{I_1\}$,s$_1$,$\{I_1\}$,s$_2$,$\{I_1\}$,s$_3$,$\{I_1\}$,S$_4$,$\{I_1\}$] while optimal solution is [$\{I_2,I_3\}$,s$_1$,$\{I_2,I_3\}$,s$_2$,$\{I_2,I_3\}$,s$_3$,$\{I_2,I_3\}$,S$_4$,$\{I_2, I_3\}$].

TABLE 1

| Sequence Index | $S_1$ | $S_2$ | $S_3$ | $S_4$ | Total Cost |
|---|---|---|---|---|---|
| Initial Cost | 100 | 100 | 100 | 100 | 400 |
| $I_1$ | 50 | 100 | 100 | 50 | 300 |
| $I_2$ | 70 | 70 | 100 | 70 | 310 |
| $I_3$ | 70 | 100 | 70 | 70 | 310 |

The two main reasons for sub-optimality of GREEDY-SEQ are storage constraints and interactions across various physical design structures. Note that there are already effective greedy search techniques that result in very good and efficient solutions in the context of set-based workload to overcome the limitations mentioned above. For example, one such technique advocates generating configurations with up to a certain size exhaustively and proceeding greedily there after. Another uses measures like benefit per unit store instead of pure benefit to mirror knapsack like approaches. These techniques can be integrated easily with GREEDY-SEQ.

Consider the complexity of GREEDY-SEQ discussed above for an N-statement sequence and M structures. The graph for each structure is same as previously discussed and has O(N) edges and nodes. The first act requires O(N*M) time. The second step can be repeated at most M times (In each invocation an element i.e. two paths in P get merged and subsequently removed from the set and the merged path gets added). Since we only retain shortest path solutions in P, an element in P always has O(N) edges and nodes. This allows act two to be solved in $O(N*M^2)$ time. As per act three, C has O(M*N) configurations as generated at most M solutions in act two and each solution has O(N) configurations. Hence, the number of nodes in act three is $O(M*N^2)$ and edges is $O(M^2*N^3)$. Therefore, GREEDY-SEQ runs in $O(M^2*N^3)$. However, in practice the number of nodes found in act three is O(M*N) as act two led to O(M) configurations resulting in $O(N*M^2)$ running time.

Figure 9:
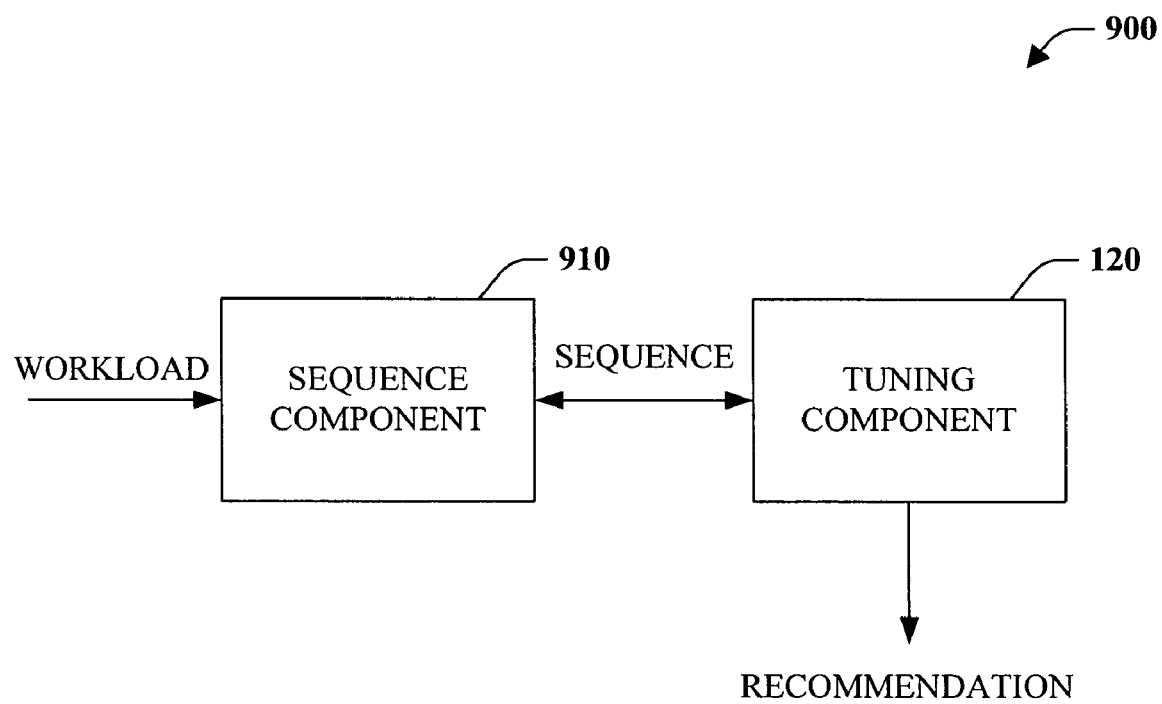
FIG. 9 is a block diagram of a sequence tuning system employing a sequence component.

Referring to FIG. 9 a sequence tuning system 900 is depicted in accordance with an aspect of the subject innovation. Similar to system 100 of FIG. 1, the system 900 can generate a tuning recommendation by exploiting sequence information concerning a workload. The system 900 includes a sequence component 910 that is communicatively coupled to tuning component 120. The sequence component 910 receives a workload and generates a sequence or sequence information pertaining to the workload. The sequence component 910 can provide such functionality in a number of ways. For example, the sequence component 910 can utilize program trace information to identify a sequence. Further yet mining techniques and/or machine learning can be employed to infer (as that term is defined herein) or predict sequence data. Additionally or alternatively, sequence information can be provided to a user to confirm correct information has been determined and/or alter the generated sequence. The sequence component 910 can interact with the tuning component 120 such that a sequence is transmitted between two components. The tuning component 120 can analyze the sequence and generate a recommendation comprising, among other things, a sequence of configurations as previously described in detail supra.

Figure 10:
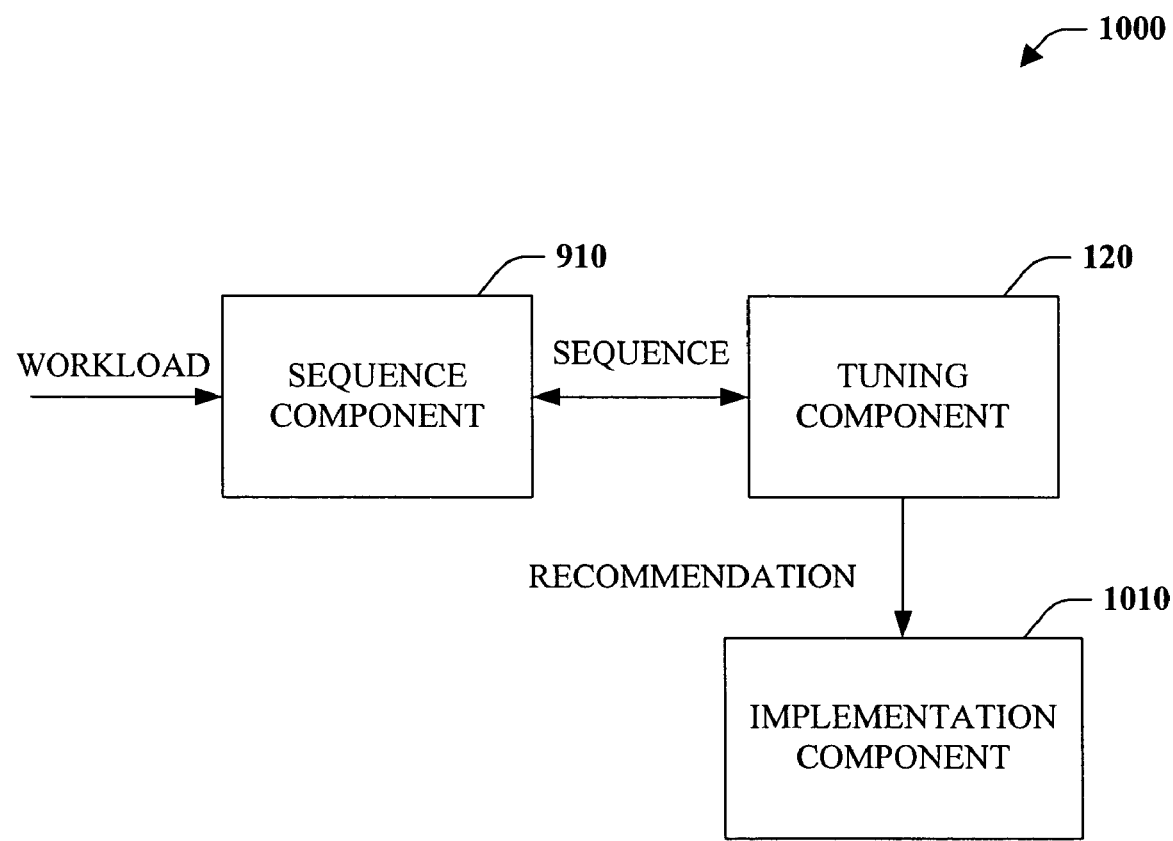
FIG. 10 is a block diagram of a sequence tuning system that implements recommendations.

FIG. 10 illustrates a sequence tuning system 1000 in accordance with yet another aspect of the subject innovation. The sequence tuning system 100 includes a sequence component 910, tuning component 120 and an implementation component 1010. As described above, the sequence component 910 is a mechanism that determines or infers sequence information relative to a workflow. The output of the component 910 is a workflow represented as sequence. The tuning component 120 generates a recommendation for a given sequence based on a number of factors. The tuning component 120 is communicatively coupled to an implementation component 1010. Accordingly, the generated recommendation can be provided or made available to the implementation component 1010. The implementation component 1010 facilitates implementation of the recommendation to take advantage of the benefits thereof. For instance, the implementation component 1010 can aid in altering code to create and/or drop design structures. By way of example, if the recommendation states that an index should be created between statement five hundred and five hundred and one, the implementation component 1010 can facilitate modification and/or generation of code such that the index can be created at the designated time.

Figure 11:
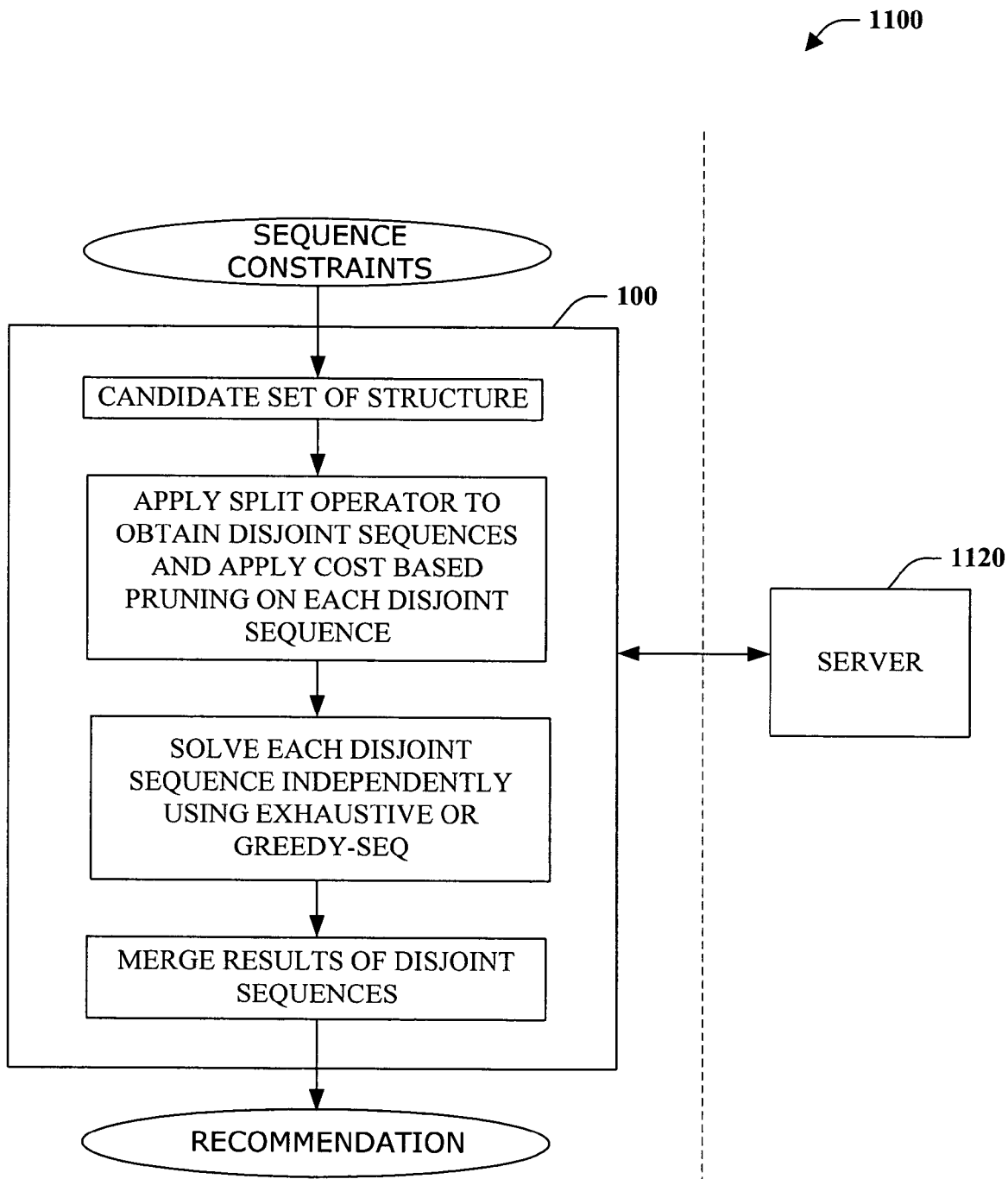
FIG. 11 is a block diagram of an exemplary tuning architecture.

Referring to FIG. 11, an exemplary tuning architecture 1100 is illustrated. As illustrated the architecture 1100 include a tuning system 100 and a server 1110. The tuning system 100, as previously described, can receive a sequence or sequence constraints and generate a recommendation. As an example, the tuning system 100 can identify a set of candidate structures, determine disjoint sequences and apply cost-base pruning on each disjoint sequence. Each disjoint sequence can be solved independently utilizing either an exhaustive or a greedy approach, for example depending on the complexity of the disjoint sequence. Subsequently, the results of each disjoint sequence can be merged together to generate the overall solution. It should be noted however that the various pieces discussed herein can be put together in different ways based on quality and performance requirements. For example, one may want to use the exhaustive strategy and not apply the split and merge operations if quality is the driving factor and enumerating all configurations is not prohibiting.

The tuning system 100 is communicatively coupled to a server 1110. The dashed line denotes the process boundary between the tuning system 100 and the server 1110. The tuning system 100 can interact with the server 1110 to, among other things, retrieve information. For example, the server 1110 can identify all relevant structures for a workload, provide traces to facilitate identification of sequence constraints, provide cost information related to statements and configurations and/or other optimizer data.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 12-16. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 12:
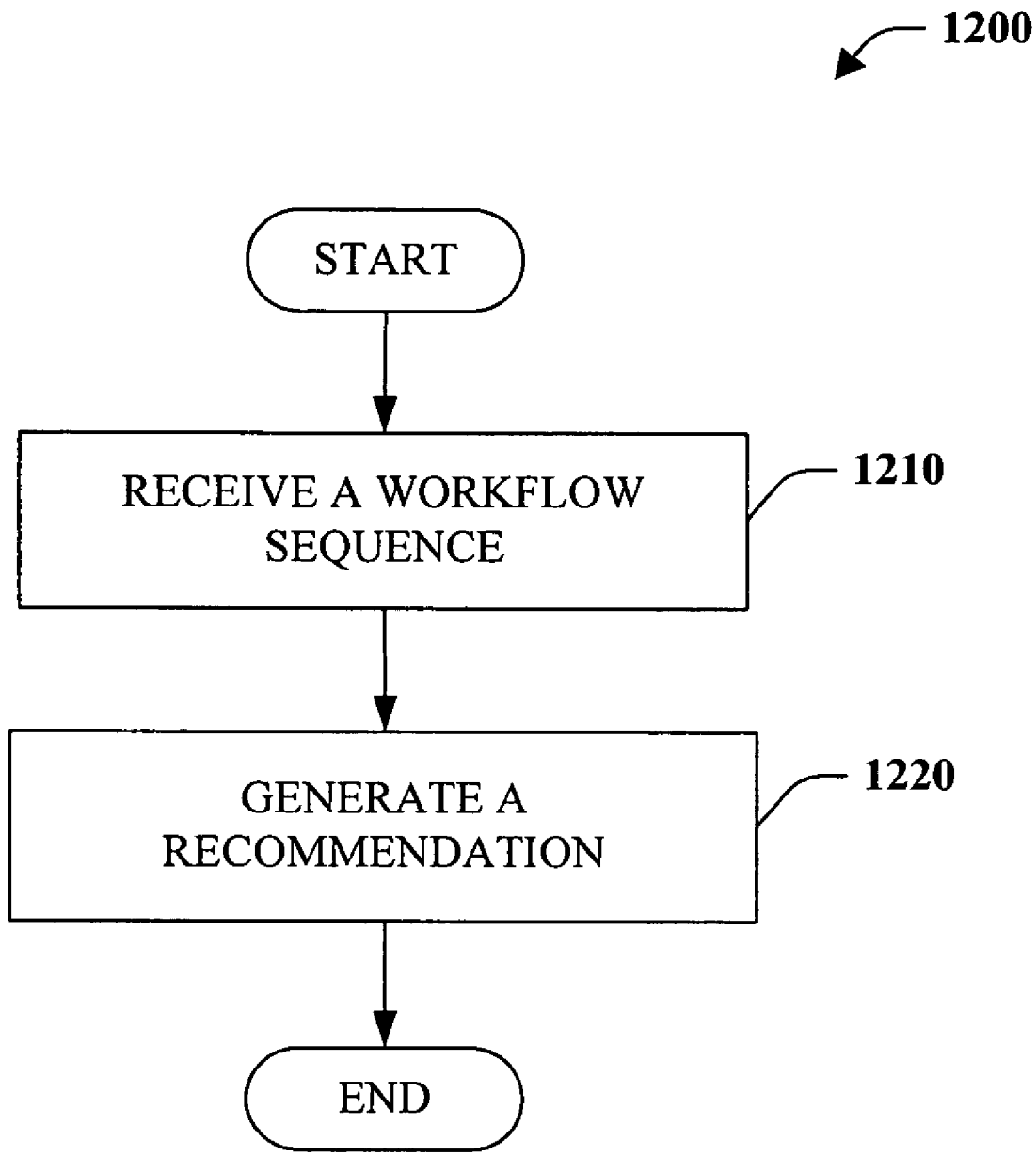
FIG. 12 is a flow chart diagram of a physical design tuning methodology.

Turning to FIG. 12, a method of physical design tuning 1200 is illustrated in accordance with an aspect of the subject innovation. At reference numeral 1210, a workflow sequence is received. In other words, sequence constraint information is received in conjunction with a workflow. In one instance, the workflow can be a set of SQL query statements, although the subject innovation is not limited thereto. At reference numeral 1220, a recommendation is generated based on the sequence information, among other things. According to one aspect of the innovation, the recommendation can take the form of another sequence including statement from the input sequence as well as create and/or drop statements relative to design structures. Such a recommendation or output sequence can be generated utilizing one or a combination of optimal, cost-base pruning, split and merge and greedy approaches.

Figure 13:
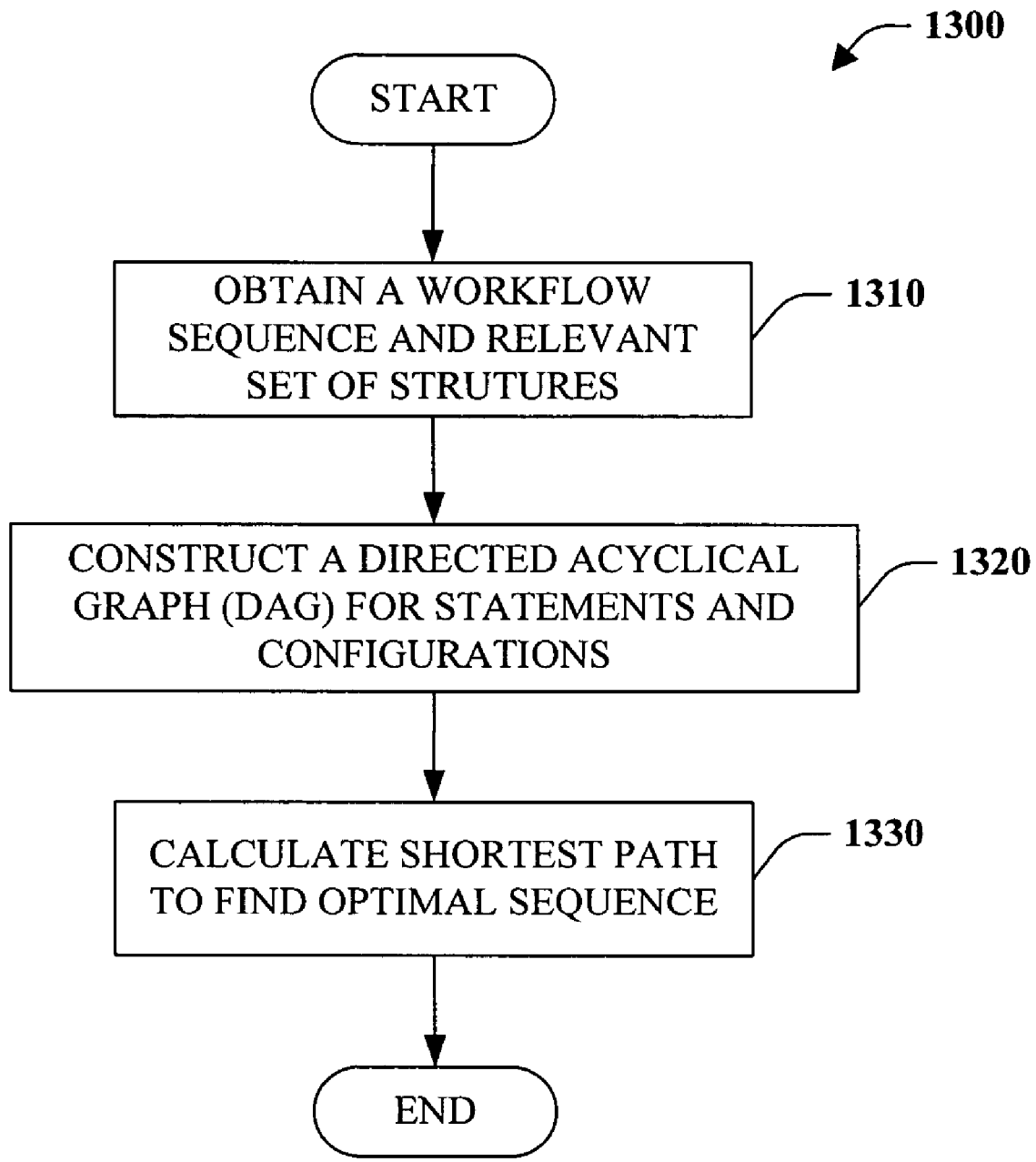
FIG. 13 is a flow chart diagram of a method of generating an optimal sequence.

FIG. 13 depicts a method of determining an optimal sequence 1300 in accordance with an aspect of the subject innovation. Initially at reference numeral 1310, a workflow sequence and relevant structures are obtained. For example, the workflow sequence could be input by a user in an XML format and relevant structures can be retrieved from a server or query optimizer associated with the server. At numeral 1320, a directed acyclic graph (DAG) or representation thereof is constructed with respect to workload statements and structures. By way of example, for every statement in input sequence, a node is generated for every possible configuration (set of structures) that can be generated from the input set of structures. The cost of every node is the cost of the statement for that configuration. Furthermore, two nodes source and destination representing the initial and final configuration are added to the graph. The cost of an edge is the cost of transitioning between configurations as represented by the nodes that define the edge. Once the graph is constructed, the optimal output sequence (i.e., recommendation) is generated at 1330 by calculating or determining the shortest path in the graph. This can be accomplished using one of many known techniques.

Figure 14:
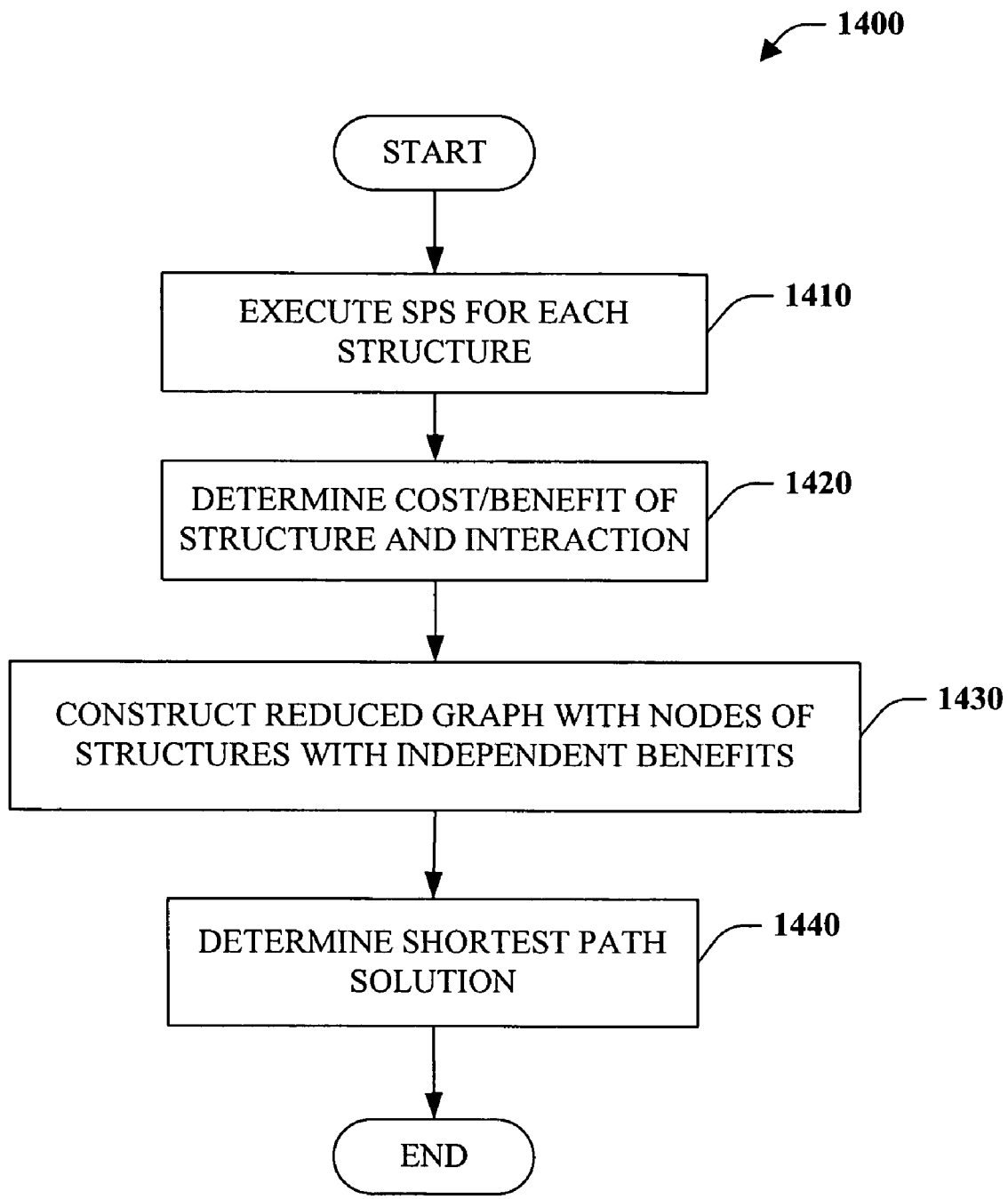
FIG. 14 is flow chart diagram of a pruning methodology.

FIG. 14 illustrates a pruning methodology 1400 in accordance with an aspect of the subject innovation. At reference numeral 1410, a shortest path solution (SPS) for each structure is generated. This refers to the SPS that can be derived by optimizing an entire input sequence for a single structure alone. At 1420, the costs/benefits are determined with respect to each structure and interaction with other structures. At numeral 1430, a reduced (or pruned) graph or representation thereof is produced where for each stage or statement the configuration nodes comprise a set of independent structures that obeys a storage bound. In other words, the benefits of structures are independent of the presence of other structures. At reference numeral 1440, the SPS is determined to obtain an output sequence solution. Method 1400 allows pruning of configurations at a given stage in the input sequence while also preserving optimality. In effect, pruning method 1400 significantly reduces nodes at various stages in the graph that would otherwise be generated by an exhaustive or optimal approach.

Figure 15:
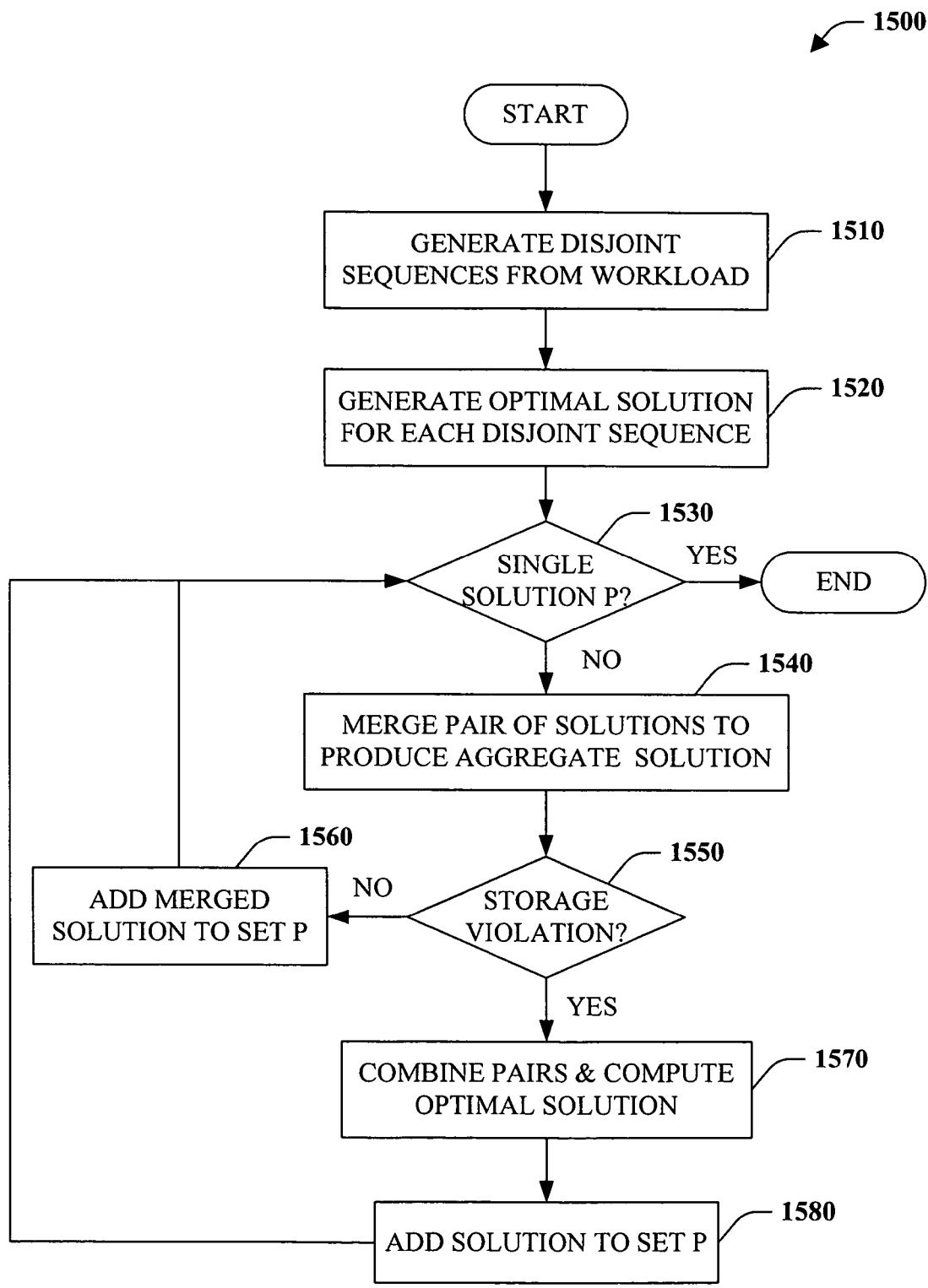
FIG. 15 is a flow chart diagram of a split and merge method.

FIG. 15 illustrates a split and merge method 1500 in accordance with an aspect of the subject innovation. At reference numeral 1510, disjoint sequences in a workflow are identified and/or generated. The set of disjoint sequences can be represented by $W_i (1<i<m)$. Given an input sequence, such disjoint sequences can be generated by looking at the syntactic structure of statements. This can be achieved by doing a simple transitive closure over the statements as follows: (1) Start with each statement as a separate sequence; (2) If two sequences are not disjoint merge them into one sequence; and (3) Continue act two until no more sequences can be merged. At numeral 1520, an optimal solution for each disjoint sequence is determined, for example using exhaustive or greedy approaches. The set of all optimal solutions for each disjoint sequence can be denoted $P=\{p_1, \ldots p_m\}$. At 1530, a determination is made as to whether the set of optimal solutions includes only a single element. If yes, the method terminates and the single element represents the optimal solution. If no, the method proceeds to 1540. At reference numeral 1540, a pair of solutions $p_i$ and $p_j$ are selected and removed from the set of solutions P and merged to generate $p_{ij}$. A determination is then made at 1550 as to whether a storage violation will occur upon adding the merged result $p_{ij}$ to P. If no, the merged result is added to the set P at 1560 and the method continues at 1530. If yes, the method proceeds at 1570 where the pair of results $p_i$ and $p_j$ are combined (not treated as disjoint) and an optimal solution is computed $q_{ij}$. At reference numeral 1580, the computed optimal solution $q_{ij}$ is added to P and the method proceeds at 1530.

Figure 16:
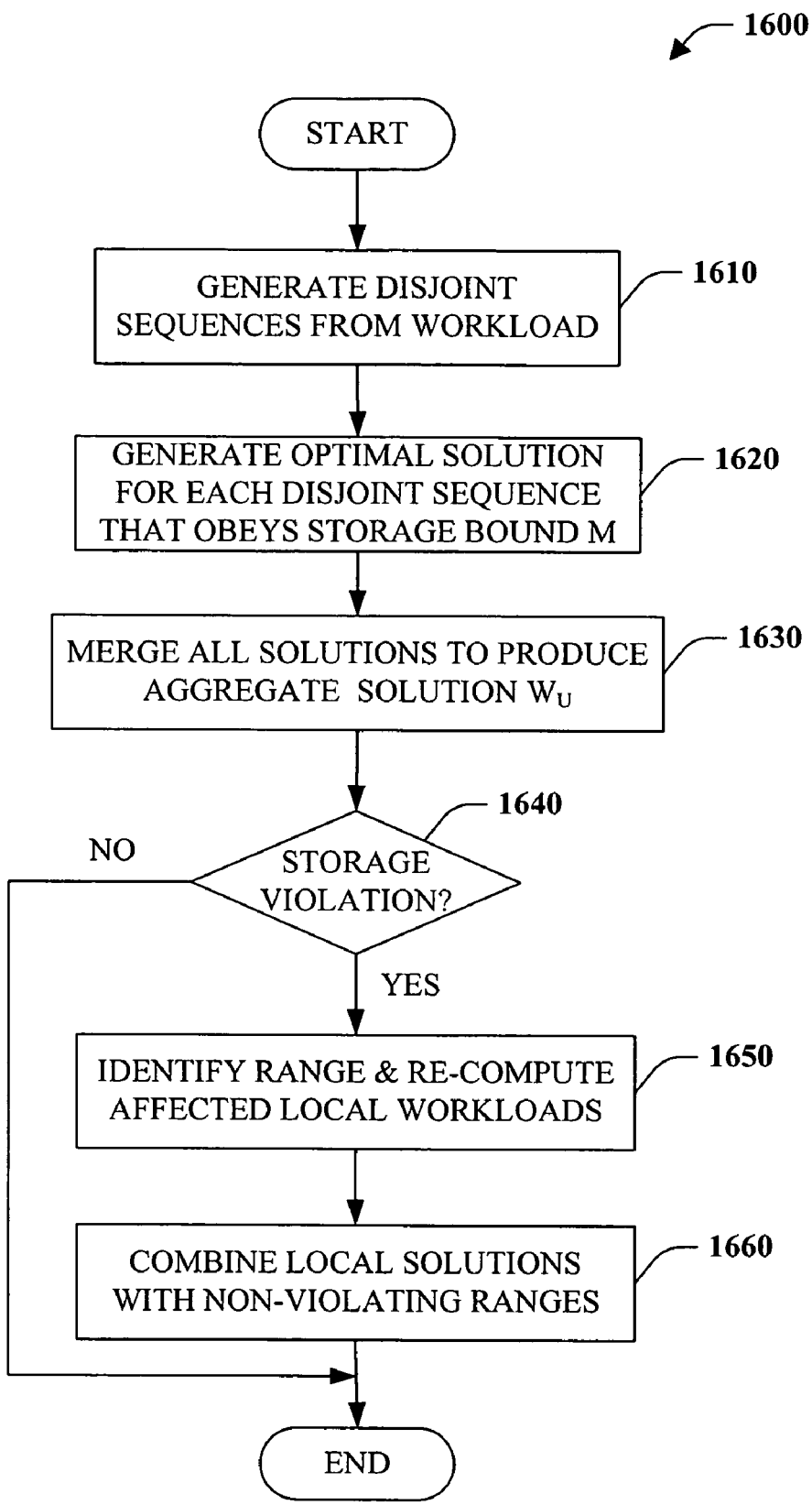
FIG. 16 is a flow chart diagram of a split and merge method.

Turning to FIG. 16, a split and merge method 1600 is depicted in accordance with an aspect of the subject innovation. While method 1500 of FIG. 15 is optimal, it can cause re-computations when the storage constraint is violated. The following method 1600 while not necessarily optimal can lead to solutions within some fraction of the optimal solution. At reference numeral 1610, disjoint sequences are generated from a workload. At 1620, an optimal solution is generated for each of the disjoint sequences that obeys a particular storage bound M. At numeral 1630, all solutions are merged to produce an aggregate solution $W_u$. At 1640, a determination is made as to whether there is a storage violation for the aggregate solution. If no, then the aggregate solution $W_u$ is optimal and the method terminates. If yes, then the ranges within the aggregate where storage violations occur are identified, and a solution recomputed that obeys a storage bound M. This can be accomplished by using preceding and following configurations from $W_u$ source and destination. At reference numeral 1660, the local solutions are combined with solutions of non-violating ranges from $W_u$ to generate a new aggregate solution $W_f$, which satisfies the storage bound.

Figure 17:
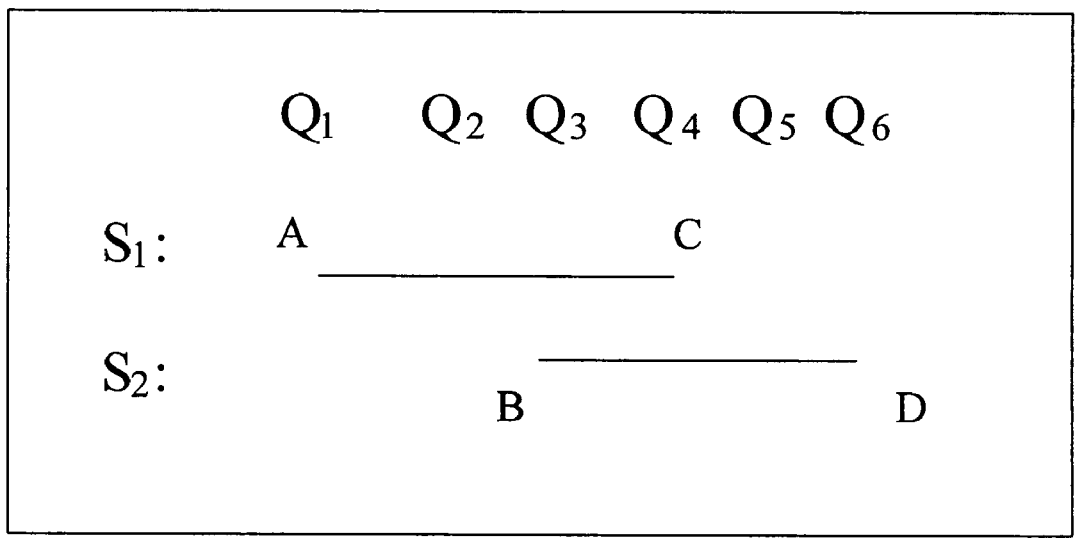
FIG. 17 is a graphical representation of two overlapping sequences.

By way of example and not limitation, assume the original sequence is represented by AD can includes statements $Q_1$ through $Q_6$. By analyzing the syntactic structures of the statements in AD, it gets broken into two disjoint sequences, AC ($Q_1$, $Q_2$ and $Q_4$) represented by $S_1$ and BD ($Q_3$, $Q_5$ and $Q_6$)

represented by $S_2$. AC and BD do not share any statements but overlap in ordering in which these occur in the original sequence. FIG. 17 illustrates this graphically to facilitate clarity and understanding.

The method 1600 finds the best solutions for AC and BD separately. Subsequently, these solutions are joined by superimposing the respective solutions. One way to think of that is to create a graph by performing the union of nodes and edges in the solutions for AC and BD and rerunning the shortest path on this graph. However, the latter is not necessary, as the shortest path for new graph would be superimposed graph of shortest path solutions for AC and BD.

If the superimposed solution does not violate storage constraint, the resulting solution is optimal and obeys all constraints. On the other hand, if it does not obey the storage constraint, the resulting solution cannot be used as such. Instead of re-optimizing the entire sequence AD again, which would have been done had we been required to generate the optimal solution, we ask the following question: can we reuse most of the computations we performed for getting solutions for AC and BD to generate a solution for AD that is close to optimal and yet reuses most of the computation already performed.

In the method described above, we break the sequences AC into AB and BC and sequence BD into BC and CD, respectively. Next, the following is observed: we already have the optimal solution for AB and CD respectively. In the next act, we generate the optimal solution for BC. If the overlap is small, this can be done very efficiently. Once this is done, we combine the solutions for AB, BC and CD to get the overall solution for AD.

This may not be optimal solution for AD but can be within some fraction of the optimal. The argument is as follows: Assume the total cost of AC and BD in the unconstrained storage world is X and total cost of AB, BC and CD is Y. The optimal in the constrained storage can be no better than X.

Figure 18:
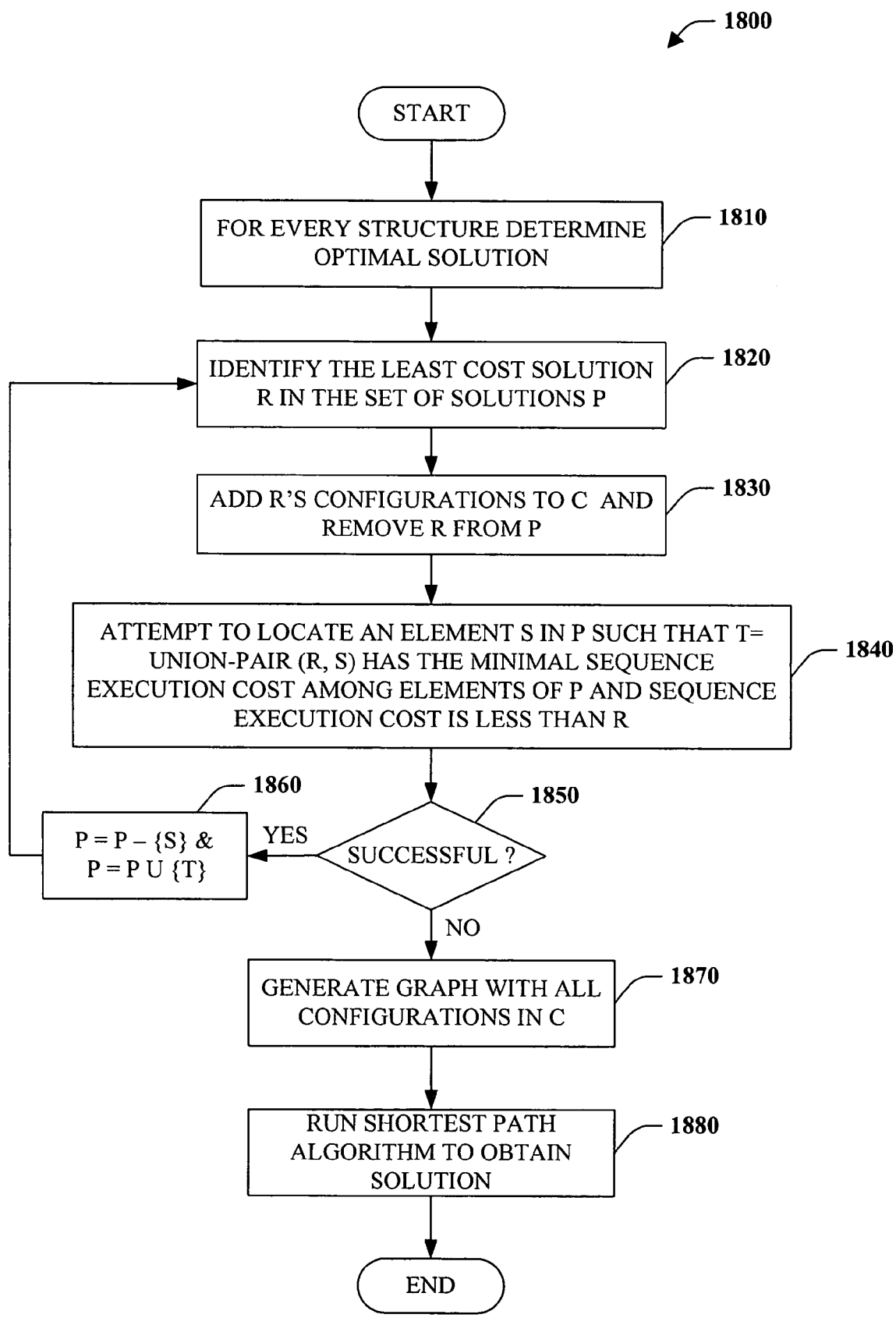
FIG. 18 is a flow chart diagram of a greedy method.

Referring to FIG. 18, a greedy method 1800 is depicted in accordance with an aspect of the subject innovation. At 1840, an optimal solution for every structure is determined. The set of solutions can be denoted P. At reference numeral 1820, the least cost solution R is identified from the set of solutions P. At 1830, the least cost solution R's configuration is added to C and R is removed from P. At reference 1840, an attempt is made to locate an element S in P such that T=union-pair (R, S) has the minimal sequence execution cost among elements of P and sequence execution cost less than R. Here, the union-pair operation takes as input two solutions and generates a shortest path solution between the two solutions. At reference 1850, a determination is made as to whether the attempt of 1840 was successful. If yes, the method proceeds to 1860 where S is removed from P and T is added to P. The method then continues at 1820. If no, a graph is generated from the configurations in C. A shortest path algorithm is rim at 1880 to obtain the solution. Subsequently, the method 1800 terminates.

Figure 19:
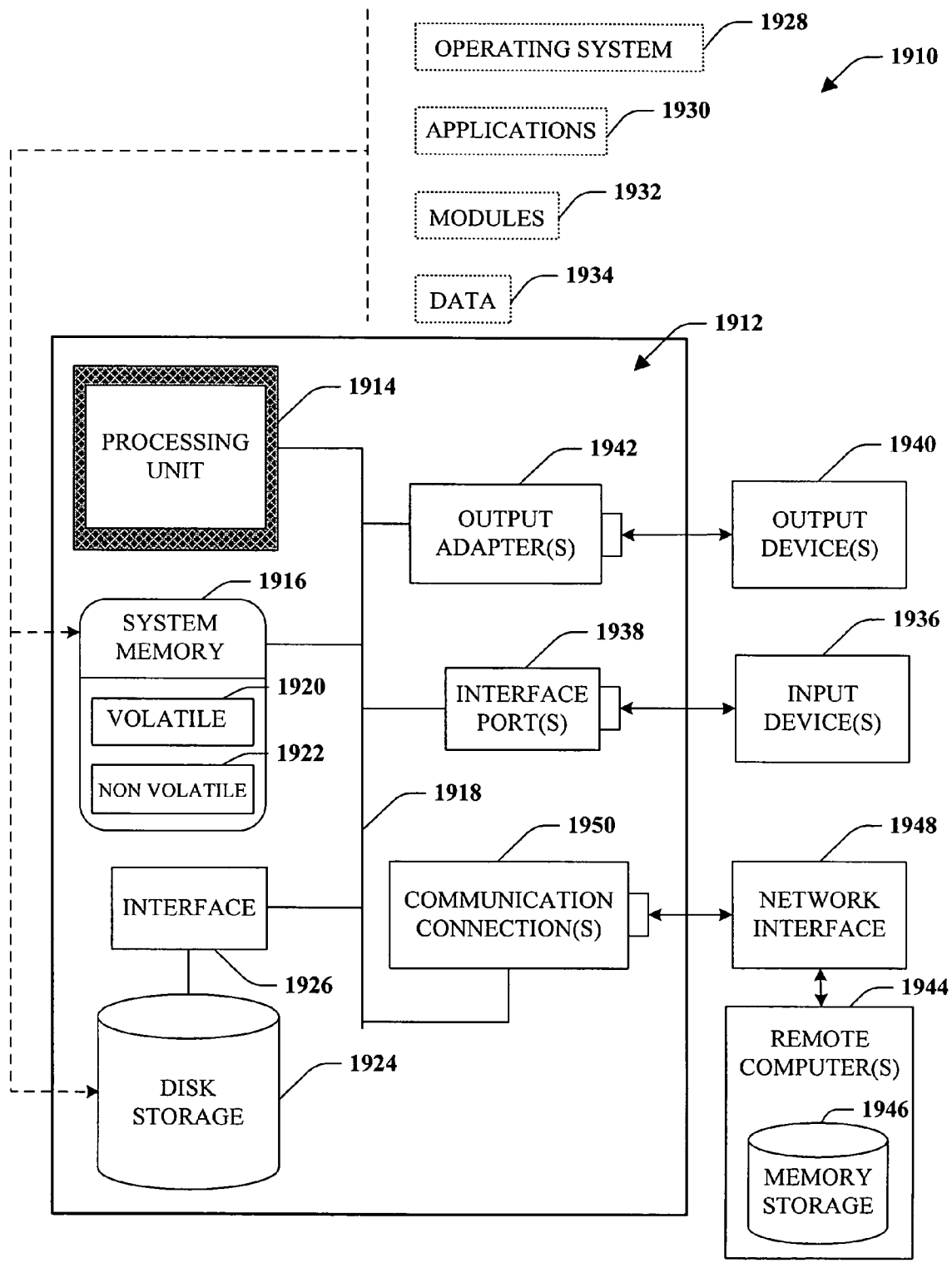
FIG. 19 is a schematic block diagram illustrating a suitable operating environment for aspects of the subject innovation.
Figure 20:
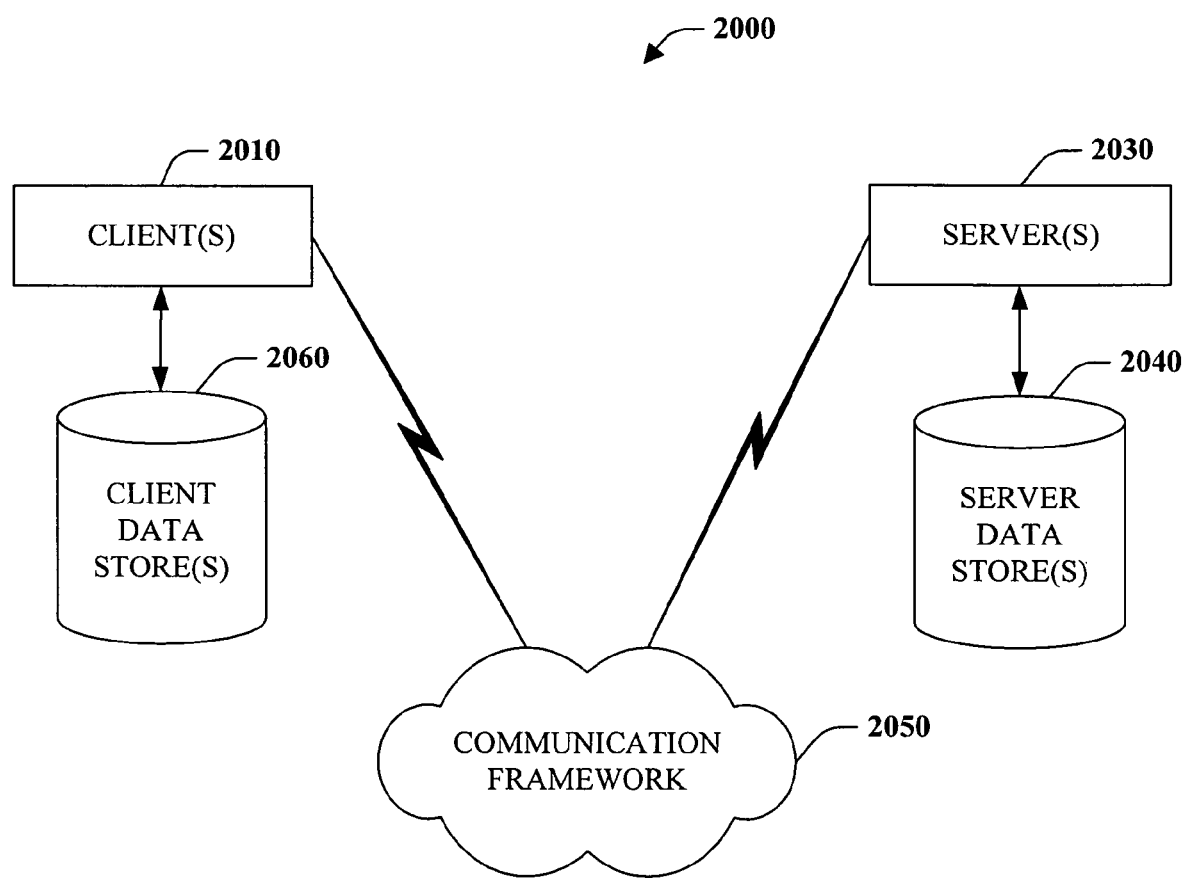
FIG. 20 is a schematic block diagram of a sample-computing environment.

In order to provide a context for the various aspects of the disclosed subject matter, FIGS. 19 and 20 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 19, an exemplary environment 1910 for implementing various aspects disclosed herein includes a computer 1912 (e.g., desktop, laptop, server, hand held, programmable consumer or industrial electronics . . . ). The computer 1912 includes a processing unit 1914, a system memory 1916, and a system bus 1918. The system bus 1918 couples system components including, but not limited to, the system memory 1916 to the processing unit 1914. The processing unit 1914 can be any of various available microprocessors. Dual microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable ROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/non-volatile computer storage media. FIG. 19 illustrates, for example, disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer system 1912. System applications 1930 take advantage of the management of resources by operating system 1928 through program modules 1932 and program data 1934 stored either in system memory 1916 or on disk storage 1924. It is to be appreciated that the present invention can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912 and to output information from computer 1912 to an output device 1940. Output adapter 1942 is provided to illustrate that there are some output devices 1940 like displays (e.g., flat panel and CRT), speakers, and printers, among other output devices 1940 that require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the bus 1918. While communication connection 1950 is shown for illustrative clarity inside computer 1916, it can also be external to computer 1912. The hardware/software necessary for connection to the network interface 1948 includes, for exemplary purposes only, internal and external technologies such as, modems including regular telephone grade modems, cable modems, power modems and DSL modems, ISDN adapters, and Ethernet cards or components.

FIG. 20 is a schematic block diagram of a sample-computing environment 2000 with which the subject innovation can interact. The system 2000 includes one or more client(s) 2010. The client(s) 2010 can be hardware and/or software (e.g., threads, processes, computing devices). The system 2000 also includes one or more server(s) 2030. Thus, system 2000 can correspond to a two-tier client server model or a multi-tier model (e.g., client, middle tier server, data server), amongst other models. The server(s) 2030 can also be hardware and/or software (e.g., threads, processes, computing devices). The servers 2030 can house threads to perform transformations by employing the subject innovation, for example. One possible communication between a client 2010 and a server 2030 may be in the form of a data packet transmitted between two or more computer processes.

The system 2000 includes a communication framework 2050 that can be employed to facilitate communications between the client(s) 2010 and the server(s) 2030. The client(s) 2010 are operatively connected to one or more client data store(s) 2060 that can be employed to store information local to the client(s) 2010. Similarly, the server(s) 2030 are operatively connected to one or more server data store(s) 2040 that can be employed to store information local to the servers 2030.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A physical design tuning system, comprising:
   a processing unit;
   a storage media, comprising:
   an acquisition component that receives an input sequence of statements representative of a workload;
   a tuning component that utilizes a relative ordering to leverage between the statements in the sequence of statements to generate a recommendation, implementation of which minimizes execution costs associated with the sequence of statements, wherein the relative ordering defines a plurality of sub-sequences or single statement sets, the sequence alternates between the sub-sequences or statement sets, wherein the recommendation includes an output sequence of statements, the output sequence of statements including each statement of the input sequence of statements, at least one create statement, and at least one drop statement, wherein the at least one create statement creates one or more physical design structures and the at least one drop statement drops one or more of the physical design structures, wherein the at least one create statement and the at least one drop statement are interleaved with the statements from the input sequence of statements, and wherein the recommendation is a sequence derived from the sequence of statements and a sequence of configurations;

an analysis component that identifies the sequence of configurations; and a pruning component that interacts with the analysis component, that produces a representation of a reduced directed acyclic graph with nodes for every statement representing configurations, and that determines an optimal sequence of configurations from the graph.

2. The system of claim 1, the analysis component receives input from an optimal component that executes an optimization algorithm to determine an optimal sequence of configurations for the sequence of statements.

3. The system of claim 1, the analysis component interacts with a split and merge component that identifies disjoint sequences that can be analyzed separately and subsequently combined to identify a sequence of configurations for the entire sequence of statements.

4. The system of claim 1, the analysis component interacts with a greedy component that implements a greedy algorithm to identify efficiently an optimal sequence of configurations.

5. The system of claim 1, further comprising an implementation component that implements the recommendation.

6. The system of claim 1, the sequence of statements is a sequence of sets of statements.

7. The system of claim 1, the sequence of statements is identified in XML.

8. The system of claim 1, further comprising a sequence component that identifies the sequence of statements or a sequence of sets of statements from the workload.

9. A database application tuning method comprising the following computer-implemented acts:

receiving an input sequence of statements representative of a workload, by a computer implementing a tuning system, the sequence of statements include a first sequence type and at least a second sequence type;

utilizing, by the computer, an associated order of the input sequence of statements to leverage between the first sequence type and the at least a second sequence type, the associated order defines a sequence or a single statement set, the sequence alternates the first sequence type and the at least a second sequence type;

identifying, by the computer, a sequence of configurations;

generating, by the computer, an output sequence that minimizes execution cost by inserting create statements, drop statements, or a combination thereof, into the input sequence of statements, such that the output sequence includes the input sequence statements and the create statements and/or drop statements, wherein the create statements create physical design structures and the drop statements remove the physical design structures, wherein the physical design structures are created before the first sequence type and the physical design structures are dropped before the second sequence type, and wherein the output sequence is a sequence derived from the input sequence of statements and the sequence of configurations;

producing, by the computer, a representation of a directed graph with one or more nodes for every statement representing configurations; and determining, by the computer, an optimal sequence of configurations from the graph.

10. The method of claim 9, generating an output sequence comprises: determining all possible configurations for each input sequence statement; and selecting configurations that minimize the total cost across the input sequence.

11. The method of claim 9, generating an output sequence comprises:

generating the representation of the directed graph that includes the one or more nodes for every statement in the input sequence representing every possible configuration for each of the input sequence statements and edges connecting the nodes that identify a cost associated with transitioning between configurations; and determining the shortest path in the graph.

12. The method of claim 9, generating an output sequence comprises:

determining a shortest path solution for each relevant structure;

analyzing each solution with respect to each statement to identify a benefit of each structure and an interaction with other structures;

generating the representation of the directed graph that includes the one or more nodes for every statement in the input sequence representing the benefit independent configurations and edges connecting the nodes that identify a cost associated with transitioning between configurations; and determining the shortest path in the graph.

13. The method of claim 9, generating an output sequence comprising:

identifying disjoint sequences in the input sequence that neither share any statements nor any structures;

determining a solution for each group of disjoint sequences; and merging the solutions to produce the output sequence.

14. The method of claim 9, generating an output sequence comprising:

executing a greedy search algorithm to determine a set of configurations of interest;

generating the representation of the directed graph that includes the one or more nodes for every statement in the input sequence representing the configurations of interest for each of the input sequence statements and edges connecting the nodes that identify a cost associated with transitioning between configurations; and determining the shortest path in the graph.

15. The method of claim 14, further comprising generating, by the computer, a candidate solution set for the search algorithm comprising:

identifying a set of structures including those structures that are optimal for at least one statement in the sequence and structures that are optimal for the entire sequence; and determining the optimal solution for every structure in the set.

16. The method of claim 9, further comprising determining, by the computer, whether to employ an optimization or greedy algorithm based on the number of structures that can be applied with respect to a given statement and/or sequence of statements.

* * * * *